(12) United States Patent
Tsuchiya

(10) Patent No.: US 12,059,970 B2
(45) Date of Patent: Aug. 13, 2024

(54) VEHICLE CONTROL DEVICE, NON-TRANSITORY STORAGE MEDIUM IN MANAGEMENT COMPUTER FOR POWER GRID, AND CONNECTOR LOCKING CONTROL METHOD

(71) Applicant: TOYOTA JIDOSHA KABUSHIKI KAISHA, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 438 days.

(21) Appl. No.: 17/459,448

(22) Filed: Aug. 27, 2021

(65) Prior Publication Data

US 2022/0072973 A1 Mar. 10, 2022

(30) Foreign Application Priority Data

Sep. 4, 2020 (JP) .................. 2020-149266

(51) Int. Cl.
*H02J 3/32* (2006.01)
*B60L 50/60* (2019.01)
*B60L 53/16* (2019.01)
*B60L 53/30* (2019.01)
*B60L 53/62* (2019.01)
*B60L 53/63* (2019.01)
*B60L 53/66* (2019.01)
(Continued)

(52) U.S. Cl.
CPC .............. *B60L 53/63* (2019.02); *B60L 50/60* (2019.02); *B60L 53/16* (2019.02); *B60L 53/305* (2019.02); *B60L 53/62* (2019.02); *B60L 53/665* (2019.02); *G06Q 30/0215* (2013.01); *G06Q 50/06* (2013.01); *B60L 2240/70* (2013.01)

(58) Field of Classification Search
CPC .......... B60L 53/63; B60L 50/60; B60L 53/16; B60L 53/62; B60L 53/14; B60L 53/65; B60L 53/68; B60L 55/00; B60L 53/66; H02J 3/322; H02J 3/466; H02J 3/48
See application file for complete search history.

(56) References Cited

U.S. PATENT DOCUMENTS 8,025,526 B1 * 9/2011 Tormey .............. H01R 13/6397
439/372
9,963,039 B1 5/2018 Jang et al.
(Continued)

FOREIGN PATENT DOCUMENTS

CN 109693567 A 4/2019
EP 3703221 A1 9/2020
(Continued)

*Primary Examiner* — Nghia M Doan
(74) *Attorney, Agent, or Firm* — Oliff PLC

(57) ABSTRACT

A control device for a vehicle having a connection port to which a connector is connectable includes a processor and the vehicle includes a power storage device configured to store electric power. The vehicle is configured to transmit the electric power between a power grid and the power storage device by connecting, to the connection port, the connector electrically connected to the power grid. The processor is configured to execute connector locking control for locking the connector connected to the connection port when participation of the vehicle in demand-and-supply adjustment of the power grid is confirmed.

17 Claims, 19 Drawing Sheets

(51) Int. Cl.
    *B60L 55/00*        (2019.01)
    *G06Q 30/0207*      (2023.01)
    *G06Q 50/06*        (2012.01)

(56) References Cited

U.S. PATENT DOCUMENTS

| | | |
|---|---|---|
| 2011/0282513 A1 | 11/2011 | Son et al. |
| 2013/0110304 A1* | 5/2013 | Shiga ................ B60L 3/04 |
| | | 700/295 |
| 2013/0169226 A1 | 7/2013 | Read |
| 2020/0091752 A1 | 3/2020 | Esaka et al. |
| 2020/0094703 A1 | 3/2020 | Ohtomo |

FOREIGN PATENT DOCUMENTS

| | | | |
|---|---|---|---|
| JP | 2014-166052 A | 9/2014 | |
| JP | 2015-096016 A | 5/2015 | |
| JP | 2020-042686 A | 3/2020 | |
| WO | 2012/057846 A1 | 5/2012 | |
| WO | 2014/132113 A2 | 9/2014 | |
| WO | 2015/071712 A1 | 5/2015 | |
| WO | WO-2016059897 A1 * | 4/2016 | .............. B60L 11/18 |
| WO | 2019/082426 A1 | 5/2019 | |

* cited by examiner

《 CHARGE SUPPRESSION SCHEDULE 》

《 POWER SUPPLY SCHEDULE 》

VEHICLE CONTROL DEVICE, NON-TRANSITORY STORAGE MEDIUM IN MANAGEMENT COMPUTER FOR POWER GRID, AND CONNECTOR LOCKING CONTROL METHOD

CROSS-REFERENCE TO RELATED APPLICATION

This application claims priority to Japanese Patent Application No. 2020-149266 filed on Sep. 4, 2020, incorporated herein by reference in its entirety.

BACKGROUND

1. Technical Field

The present disclosure relates to a vehicle control device, a non-transitory storage medium in a management computer for a power grid, and a connector locking control method.

2. Description of Related Art

In recent years, demand response (hereinafter referred to as "DR") has attracted attention as a method for demand-and-supply adjustment in a power grid. In DR, a predetermined request is made on demanders of the power grid by using DR signals. DR is roughly classified into two types, that is, DR that requests mitigation of power shortage (for example, reduction of power demand or reverse power flow) (hereinafter referred to also as "negative DR"), and DR that requests increase of power demand (hereinafter referred to also as "positive DR").

For example, International Publication No. 2019/082426 (WO 2019/082426 A) discloses a technology for adjusting power demand by DR.

SUMMARY

A user of a vehicle including a connection port and a power storage device can participate in DR by using the vehicle. A connector is connectable to the connection port. The power storage device can perform at least one of input (charge) of electric power supplied from the connection port and output (discharge) of electric power to the connection port. The user of the vehicle can contribute to demand-and-supply adjustment in a power grid by controlling charge or discharge of the power storage device in a state in which the connector electrically connected to the power grid is connected to the connection port. By participating in the DR, the user of the vehicle can receive an incentive from a manager of the power grid. The participation in the DR means that the demand-and-supply adjustment in the power grid is executed in response to a request of the DR.

If the connector is left unlocked after the user of the vehicle accepts to participate in the DR, someone may detach the connector from the connection port. It is difficult for the vehicle to participate in the DR in a state in which the connector is not connected to the connection port. When the DR is started in the state in which the connector is not connected to the connection port, the vehicle is absent from the DR, and the user of the vehicle loses an opportunity to receive an incentive. The user of the vehicle who does not respond to the request of the DR despite acceptance of the request may have a predetermined penalty.

The present disclosure provides a vehicle control device, a non-transitory storage medium in a management computer for a power grid, and a connector locking control method that are capable of suppressing detachment of a connector from a connection port of a vehicle after the vehicle has confirmed participation in demand-and-supply adjustment in the power grid.

A first aspect of the present disclosure is a control device for a vehicle having a connection port to which a connector is connectable. The control device includes a processor and the vehicle includes a power storage device configured to store electric power. The vehicle is configured to transmit the electric power between a power grid and the power storage device by connecting, to the connection port, the connector electrically connected to the power grid. The processor is configured to execute connector locking control for locking the connector connected to the connection port when the participation of the vehicle in demand-and-supply adjustment of the power grid is confirmed.

According to the first aspect, the connector locking control is executed when the participation of the vehicle in the demand-and-supply adjustment of the power grid is confirmed. This configuration suppresses detachment of the connector from the connection port of the vehicle after the participation of the vehicle in the demand-and-supply adjustment of the power grid is confirmed.

In the first aspect, the processor may be configured to execute connector unlocking control for unlocking the connector connected to the connection port after the demand-and-supply adjustment of the power grid is completed.

According to the configuration described above, the connector unlocking control is executed after the demand-and-supply adjustment of the power grid is completed. Thus, user's time and effort to unlock the connector after the completion of the demand-and-supply adjustment in the power grid are saved, thereby improving user's convenience.

The participation of the vehicle in the demand-and-supply adjustment in the power grid is hereinafter referred to simply as "participation" as well. The condition to confirm the participation can be set arbitrarily. The participation may be confirmed at a timing when the user of the vehicle has sent a response to accept a request from a manager of the power grid, at a timing when a time margin set after the acceptance of the request has elapsed, or at a timing when the connector is connected to the connection port after the acceptance of the request.

In the first aspect, the processor may be configured to respond whether the processor accepts a request when the request to participate in the demand-and-supply adjustment in the power grid is received from a management computer for the power grid. The participation of the vehicle in the demand-and-supply adjustment of the power grid is confirmed when the processor sends a response to accept the request in a state where the connector is connected to the connection port.

In the first aspect, the processor may be configured to respond whether the processor accepts a request when the request to participate in the demand-and-supply adjustment of the power grid is received from a management computer for the power grid. The participation in the demand-and-supply adjustment of the power grid is confirmed when a predetermined period elapses in a state where the connector is not detached from the connection port within the predetermined period. The predetermined period is set after the processor has sent a response to accept the request in a state where the connector is connected to the connection port. The "predetermined period" in this configuration is hereinafter referred to also as "first time margin".

In the first aspect, the processor may be configured to respond whether the processor accepts a request when the request to participate in the demand-and-supply adjustment of the power grid is received from a management computer for the power grid. The participation of the vehicle in the demand-and-supply adjustment of the power grid is confirmed when the connector is connected to the connection port within a predetermined period set after the processor has sent a response to accept the request. The "predetermined period" in this configuration is hereinafter referred to also as "second time margin".

In the first aspect, the processor may be configured to transmit, to the management computer, a signal indicating that the vehicle does not participate in the demand-and-supply adjustment of the power grid when the connector is detached from the connection port within the predetermined period. According to this configuration, the user of the vehicle can cancel the participation by detaching the connector from the connection port within the first time margin (period after the acceptance of the request and before the confirmation of the participation). The first time margin may be a period in which no penalty is imposed even if the user of the vehicle changes his/her mind to decide absence.

The connector locking control may be executed when participation of the vehicle in demand-and-supply adjustment of the power grid that satisfies a predetermined requirement is confirmed. More specifically, in the first aspect, the processor may be configured to execute the connector locking control when the participation in the demand-and-supply adjustment of the power grid that satisfies a predetermined requirement is confirmed. The processor may be configured not to execute the connector locking control when the participation of the vehicle in the demand-and-supply adjustment in the power grid that does not satisfy the predetermined requirement is confirmed. This configuration suppresses a decrease in the user's convenience due to unnecessary connector locking control. The "predetermined requirement" in this configuration is hereinafter referred to also as "locking requirement".

In the first aspect, the processor may be configured to execute unlocking prohibition control (hereinafter referred to also as "first unlocking prohibition control") for prohibiting unlocking of the connector connected to the connection port during a period from a start to an end of the demand-and-supply adjustment of the power grid.

According to the above configuration, it is possible to suppress detachment of the connector from the connection port of the vehicle during the period from the start to the end of the demand-and-supply adjustment in the power grid.

In the first aspect, the processor may be configured to execute unlocking prohibition control (hereinafter referred to also as "second unlocking prohibition control") for selectively prohibiting unlocking of the connector connected to the connection port in response to a request from a user during a period from a start to an end of the demand-and-supply adjustment of the power grid.

According to the above configuration, it is possible to suppress detachment of the connector from the connection port of the vehicle during the period from the start to the end of the demand-and-supply adjustment in the power grid. It is appropriate that the prohibition period of each unlocking prohibition control include the period from the start to the end of the demand-and-supply adjustment in the power grid. The prohibition period may be a period from the confirmation of the participation of the vehicle in the demand-and-supply adjustment in the power grid to the completion of the demand-and-supply adjustment in the power grid.

Each unlocking prohibition control may be executed when the vehicle has confirmed participation in demand-and-supply adjustment in the power grid that satisfies a predetermined requirement. More specifically, in the first aspect, the processor may be configured to execute, when the participation of the vehicle in the demand-and-supply adjustment of the power grid that satisfies a predetermined requirement is confirmed, the unlocking prohibition control during a period from a start to an end of the demand-and-supply adjustment of the power grid. The processor may be configured not to execute, when the participation of the vehicle in the demand-and-supply adjustment of the power grid that does not satisfy the predetermined requirement is confirmed, the unlocking prohibition control during a period from a start to an end of the demand-and-supply adjustment of the power grid. This configuration suppresses a decrease in the user's convenience due to unnecessary unlocking prohibition control. The "predetermined requirement" is hereinafter referred to also as "unlocking prohibition requirement".

The locking requirement and the unlocking prohibition requirement can be set arbitrarily. For example, each of the locking requirement and the unlocking prohibition requirement may be satisfied when the user of the vehicle has a significant detriment because the connector is detached from the connection port of the vehicle and the vehicle cannot participate in the demand-and-supply adjustment in the power grid. More specifically, in the first aspect, at least one of the locking requirement and the unlocking prohibition requirement may be satisfied when a reward for the demand-and-supply adjustment of the power grid is equal to or larger than a predetermined value, or when a penalty is imposed due to inexecution of the demand-and-supply adjustment of the power grid.

The execution timing of the connector locking control can be set arbitrarily as long as the vehicle has confirmed the participation in the demand-and-supply adjustment in the power grid at that timing.

In the first aspect, the processor may be configured to execute the connector locking control at a timing when the vehicle has confirmed the participation in the demand-and-supply adjustment of the power grid.

In the first aspect, the processor may be configured to execute the connector locking control at a timing earlier by a predetermined period than a start time of the demand-and-supply adjustment in the power grid after the vehicle has confirmed the participation in the demand-and-supply adjustment of the power grid.

A second aspect of the present disclosure is a non-transitory storage medium storing instructions that are executable by one or more processors in a management computer for a power grid, and that cause the one or more processors to perform functions. The management computer is configured to send a request for demand-and-supply adjustment of the power grid to a user of a vehicle having a connection port to which a connector is connectable, and a power storage device configured to perform at least one of input of electric power supplied from the connection port and output of electric power to the connection port. The functions include requesting the vehicle to execute connector locking control for locking the connector connected to the connection port when participation of the vehicle in the demand-and-supply adjustment of the power grid is confirmed.

According to the second aspect, the vehicle is requested to execute the connector locking control when the participation of the vehicle in the demand-and-supply adjustment of the power grid is confirmed. This configuration suppresses detachment of the connector from the connection port of the vehicle after the participation of the vehicle in the demand-and-supply adjustment of the power grid is confirmed.

The condition to confirm the participation can be set arbitrarily. For example, in the second aspect, the participation of the vehicle in the demand-and-supply adjustment in the power grid may be confirmed when a request to participate in the demand-and-supply adjustment in the power grid is sent to the user of the vehicle and a response to accept the request is received.

The request from the management computer for the power grid to the user of the vehicle may be transmitted to a communication apparatus mounted on the vehicle where the user is riding, or to a mobile terminal carried by the user. The user of the vehicle can transmit a signal indicating acceptance of the request from the communication apparatus or the mobile terminal to the management computer for the power grid.

The timing to request the vehicle for the connector locking control is any timing after the vehicle has confirmed the participation in the demand-and-supply adjustment in the power grid. For example, the management computer for the power grid may be configured to request the vehicle to execute the connector locking control at a timing when information related to the demand-and-supply adjustment in the power grid (for example, a schedule of the demand-and-supply adjustment) is transmitted to the vehicle that participates in the demand-and-supply adjustment in the power grid after the vehicle has confirmed the participation in the demand-and-supply adjustment in the power grid.

The management computer for the power grid may be configured to control charge and discharge of the power storage device mounted on the vehicle by remotely operating the vehicle in a target period of the accepted request.

A third aspect of the present disclosure relates to a connector locking control method. The control method includes sending, by a management computer for a power grid, a request for demand-and-supply adjustment of the power grid to a user of a vehicle having a connection port to which a connector is connectable, and a power storage device configured to perform at least one of input of electric power supplied from the connection port and output of electric power to the connection port. The control method includes responding to the management computer about accepting the request. The control method includes executing connector locking control for locking the connector connected to the connection port in the vehicle at a predetermined connector lock timing after a response to accept the request is sent.

According to the third aspect, the connector locking control is executed when the user of the vehicle has sent the response to accept the request for the demand-and-supply adjustment of the power grid. This method suppresses detachment of the connector from the connection port of the vehicle after the participation of the vehicle in the demand-and-supply adjustment of the power grid is confirmed.

The vehicle may be a motor vehicle. The motor vehicle may be configured to travel by using electric power stored in the power storage device. Examples of the motor vehicle include an electric vehicle (EV), a plug-in hybrid vehicle (PHV), a fuel cell vehicle (FCV), and a range extender EV.

According to the first aspect, the second aspect, and the third aspect of the present disclosure, it is possible to suppress the detachment of the connector from the connection port of the vehicle after the vehicle has confirmed the participation in the demand-and-supply adjustment in the power grid.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
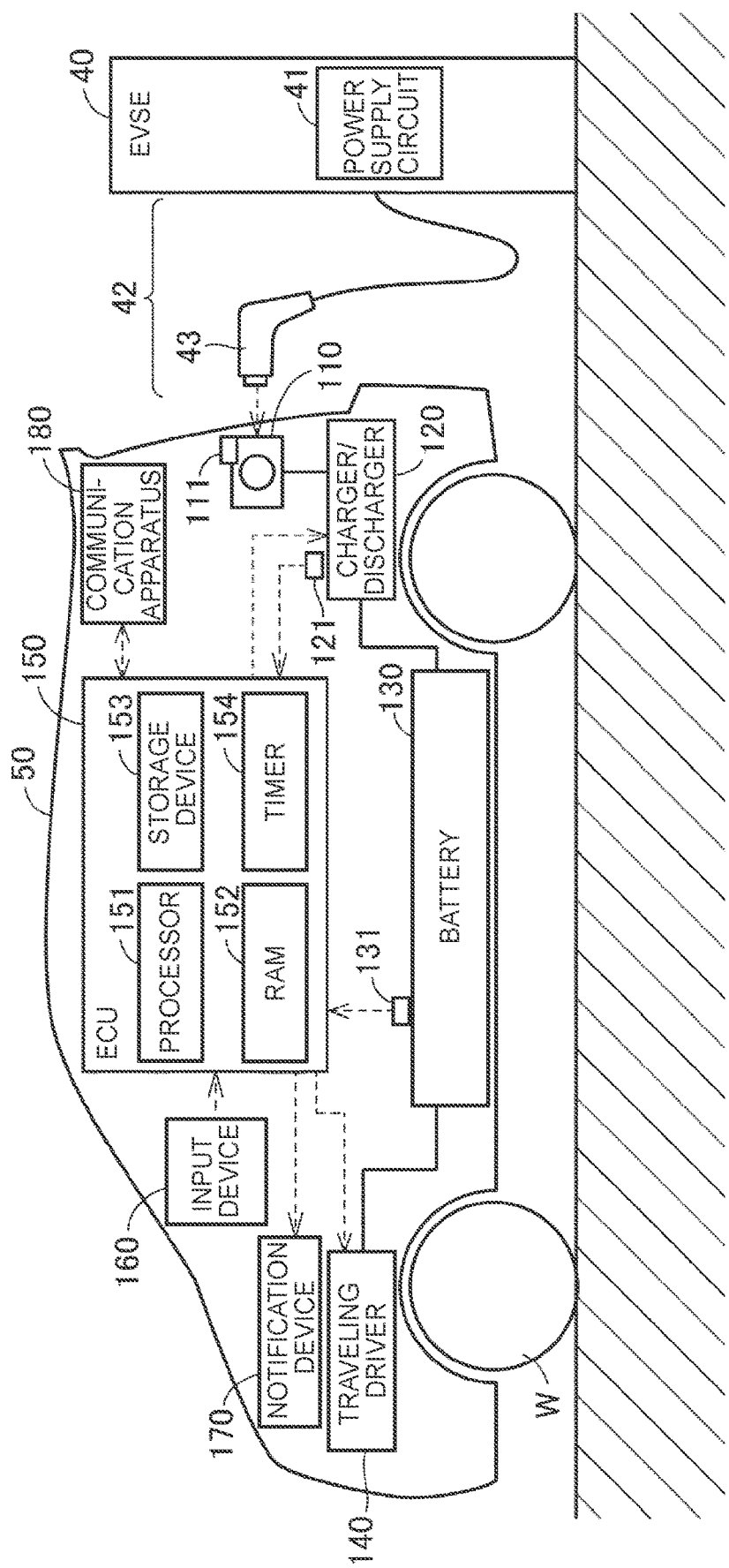
FIG. 1 is a diagram illustrating the configuration of a vehicle in an electric power system according to an embodiment of the present disclosure.

An embodiment of the present disclosure is described below in detail with reference to the drawings. In the drawings, the same or corresponding parts are represented by the same reference symbols to omit repetitive description.

An electric power system according to this embodiment includes a plurality of motor vehicles. The motor vehicles in the electric power system may have different configurations. In this embodiment, each motor vehicle in the electric power system has a configuration illustrated in FIG. 1. Unless otherwise distinguished, each of the motor vehicles in the electric power system is hereinafter referred to as "vehicle 50", and each of a plurality of EVSEs in the electric power system is hereinafter referred to as "EVSE 40". The EVSE stands for "Electric Vehicle Supply Equipment".

FIG. 1 is a diagram illustrating the configuration of the vehicle 50 in the electric power system according to this embodiment. Referring to FIG. 1, the vehicle 50 includes a battery 130 configured to store traveling electric power. The battery 130 includes a secondary battery such as a lithium ion battery or a nickel-metal hydride battery. In this embodiment, a battery pack including a plurality of lithium ion batteries is employed as the secondary battery. The battery pack has a plurality of electric cells (generally referred to also as "cells") electrically connected together. Any other power storage device such as an electric double layer capacitor may be employed in place of the secondary battery. The battery 130 according to this embodiment corresponds to an example of "power storage device" according to the present disclosure.

The vehicle 50 includes an electronic control unit (hereinafter abbreviated as "ECU") 150. The ECU 150 controls charge and discharge of the battery 130. The ECU 150 also controls communication with the outside of the vehicle 50. The vehicle 50 may be an electric vehicle (EV) configured to travel by using only electric power stored in the battery 130, or a plug-in hybrid vehicle (PHV) configured to travel by using both the electric power stored in the battery 130 and power output from an engine (not illustrated). In this embodiment, the vehicle 50 is driven by a user, but may be driven autonomously. The ECU 150 according to this embodiment corresponds to an example of "vehicle control device" according to the present disclosure.

The vehicle 50 further includes a monitoring module 131 configured to monitor conditions of the battery 130. The monitoring module 131 includes various sensors configured to detect the conditions of the battery 130 (for example, voltage, current, and temperature), and outputs detection results to the ECU 150. The monitoring module 131 may be a battery management system (BMS) having a state-of-charge (SOC) estimation function, a state-of-health (SOH) estimation function, a cell voltage equalization function, a diagnosis function, and a communication function in addition to the sensor functions. The ECU 150 can acquire the conditions of the battery 130 (for example, temperature, current, voltage, SOC, and internal resistance) based on outputs from the monitoring module 131.

The vehicle 50 includes an inlet 110 and a charger/discharger 120 adaptable to a power supply system of the EVSE 40. The inlet 110 receives electric power supplied from the outside of the vehicle 50. The inlet 110 also outputs electric power supplied from the charger/discharger 120 to the outside of the vehicle 50. The battery 130 can input electric power supplied from the inlet 110 and output electric power to the inlet 110. The inlet 110 according to this embodiment corresponds to an example of "connection port" according to the present disclosure. Although FIG. 1 illustrates only the inlet 110 and the charger/discharger 120, the vehicle 50 may include inlets for individual power supply systems to adapt to a plurality of types of power supply system (for example, an alternating current (AC) system and a direct current (DC) system).

The EVSE 40 includes a power supply circuit 41. An outlet cable 42 is connected to the EVSE 40. The outlet cable 42 may be connected constantly to the EVSE or detachable from the EVSE 40. The outlet cable 42 has a connector 43 at the distal end, and includes a power line inside.

The connector 43 of the outlet cable 42 is connectable to the inlet 110. The inlet 110 is provided with a connector lock device 111. The connector lock device 111 switches a locked state and an unlocked state of the connector 43. The EVSE 40 and the vehicle 50 are electrically connected such that the connector 43 of the outlet cable 42 connected to the EVSE 40 is connected to the inlet 110 of the vehicle 50. Thus, electric power can be supplied from the EVSE 40 to the vehicle 50 through the outlet cable 42.

Figure 2:
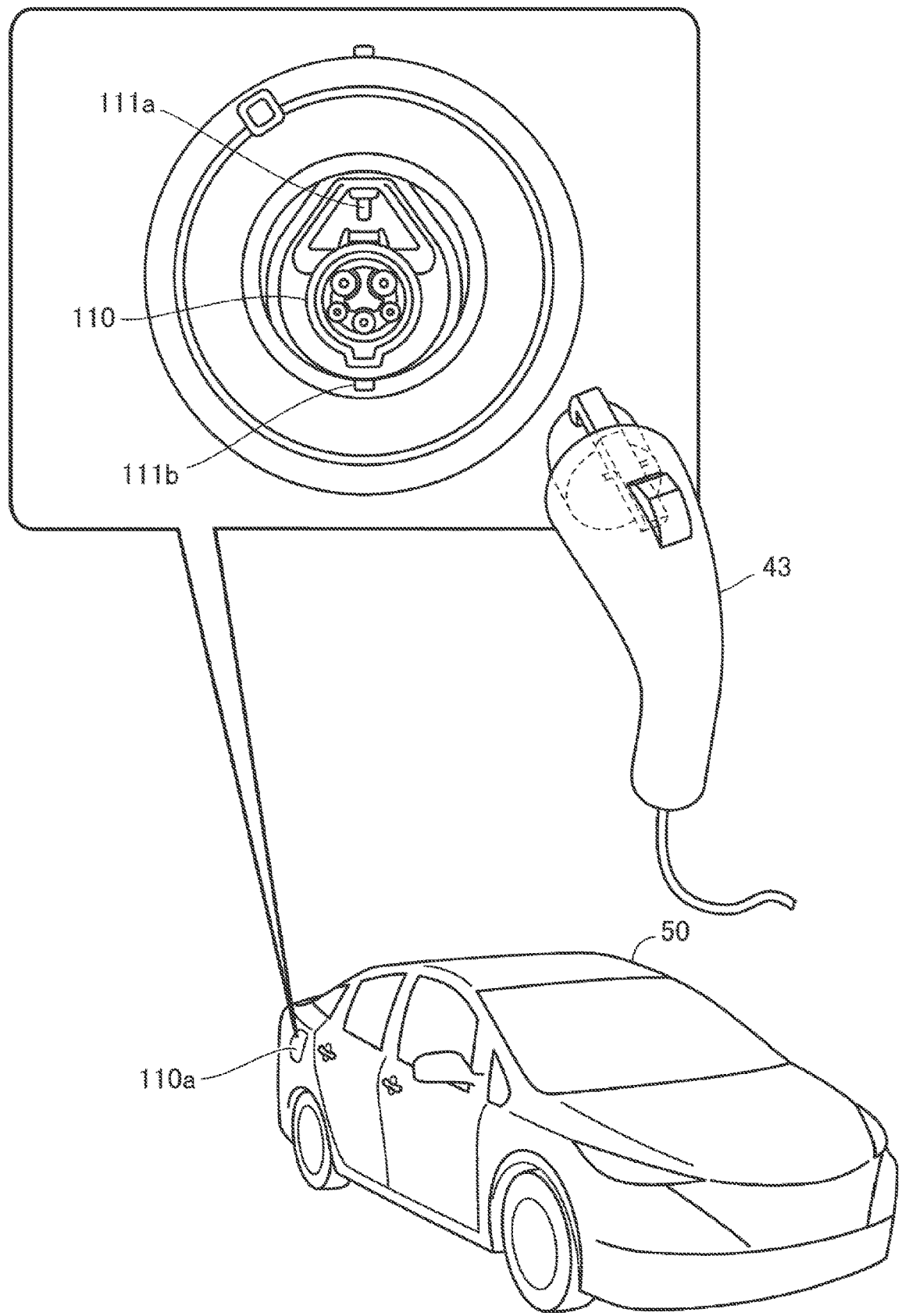
FIG. 2 is a diagram for describing a structure around a connection port of the vehicle illustrated in FIG. 1.

FIG. 2 is a diagram for describing a structure around the inlet 110 of the vehicle 50. Referring to FIG. 2 together with FIG. 1, a lid 110a is provided at the inlet 110 of the vehicle 50. The lid 110a is coupled to a vehicle body via an open/close mechanism (for example, a hinge) to open or close an opening formed in the vehicle body. When the user opens the lid 110a, the inlet 110 is exposed as illustrated in an upper part of FIG. 2. The connector lock device 111 (FIG. 1) includes a lock mechanism including a lock pin 111a, a connection sensor 111b, and an actuator (not illustrated) configured to drive the lock mechanism. The connection sensor 111b detects whether the connector 43 is connected to the inlet 110, and outputs a detection result to the ECU 150 (FIG. 1). When the ECU 150 controls the connector lock device 111 in a state in which the connector 43 is connected to the inlet 110, the connector-locked state and the connector-unlocked state are switched. In the connector-locked state, detachment of the connector 43 from the inlet 110 is restricted. In the connector-unlocked state, the detachment of the connector 43 from the inlet 110 is permitted. In the connector-locked state of this embodiment, the lock pin 111a engages with the connector 43 by being driven by the actuator. Thus, the detachment of the connector 43 is restricted. In the connector-unlocked state, the lock pin 111a disengages from the connector 43, and the detachment of the connector 43 is permitted. The position of the inlet 110 is not limited to the position illustrated in FIG. 2 (side of the vehicle body at the rear), and may be set arbitrarily.

Referring back to FIG. 1, the charger/discharger 120 is located between the inlet 110 and the battery 130. The charger/discharger 120 includes a relay and a power conversion circuit (for example, a bidirectional converter) (both of which are not illustrated). The relay switches connection and disconnection of a power path from the inlet 110 to the battery 130. The relay and the power conversion circuit in the charger/discharger 120 are controlled by the ECU 150. The vehicle 50 further includes a monitoring module 121 configured to monitor conditions of the charger/discharger 120. The monitoring module 121 includes various sensors configured to detect the conditions of the charger/discharger 120 (for example, voltage, current, and temperature), and outputs detection results to the ECU 150. In this embodiment, the monitoring module 121 detects a voltage and a current input to the power conversion circuit and a voltage and a current output from the power conversion circuit.

Electric power can be exchanged between the EVSE 40 and the vehicle 50 by connecting the EVSE 40 and the inlet 110 via the outlet cable 42. Therefore, the vehicle 50 can execute external power charge (that is, the battery 130 of the vehicle 50 can be charged with electric power supplied from the outside of the vehicle 50). For example, the electric power for the external power charge is supplied from the EVSE 40 to the inlet 110 through the outlet cable 42. The charger/discharger 120 converts the electric power received by the inlet 110 into electric power suited to charging of the battery 130, and outputs the converted electric power to the battery 130. The vehicle 50 can also execute external power supply (that is, the vehicle 50 can supply electric power to the EVSE 40 through the outlet cable 42) by connecting the EVSE 40 and the inlet 110 via the outlet cable 42. The electric power for the external power supply is supplied from the battery 130 to the charger/discharger 120. The charger/discharger 120 converts the electric power supplied from the battery 130 into electric power suited to the external power supply, and outputs the converted electric power to the inlet 110. When the external power charge or the external power supply is executed, the relay of the charger/discharger 120 is closed (connected). When neither the external power charge nor the external power supply is executed, the relay of the charger/discharger 120 is open (disconnected).

The structure of the charger/discharger 120 is not limited to the structure described above, and may be changed as appropriate. For example, the charger/discharger 120 may include at least one of a rectifying circuit, a power factor correction (PFC) circuit, an isolation circuit (for example, an isolation transformer), an inverter, and a filter circuit. In a case where the vehicle 50 executes external power supply to an AC-EVSE, the charger/discharger 120 may execute DC/AC conversion for electric power discharged from the battery 130, and AC power obtained through the conversion may be supplied from the vehicle 50 to the EVSE. In a case where the vehicle 50 executes external power supply to a DC-EVSE, DC power may be supplied from the vehicle 50 to the EVSE, and an inverter in the EVSE may execute DC/AC conversion. The standard for the DC-EVSE may be CHAdeMO, Combined Charging System (CCS), GB/T, or Tesla.

The ECU 150 includes a processor 151, a random access memory (RAM) 152, a storage device 153, and a timer 154. Examples of the processor 151 include a central processing unit (CPU). The RAM 152 functions as a working memory configured to temporarily store data to be processed by the processor 151. The storage device 153 can save stored information. For example, the storage device 153 includes a read only memory (ROM) and a rewritable non-volatile memory. The storage device 153 stores programs and information for use in the programs (for example, maps, mathematical expressions, and various parameters). In this embodiment, the processor 151 executes the programs stored in the storage device 153 to execute various types of control of the ECU 150. The various types of control of the ECU 150 may be executed by dedicated hardware (electronic circuit) instead of being executed by software. The ECU 150 may have any number of processors, and processors may be prepared for predetermined types of control, respectively.

The timer 154 notifies the processor 151 about arrival of a set time. When the time set in the timer 154 has come, the timer 154 transmits, to the processor 151, a signal indicating that the time has come. In this embodiment, a timer circuit is employed as the timer 154. The timer 154 may be implemented by software instead of hardware (timer circuit). The ECU 150 can acquire a current time by using a real-time clock (RTC) circuit (not illustrated) in the ECU 150.

The vehicle 50 further includes a traveling driver 140, an input device 160, a notification device 170, a communication apparatus 180, and driving wheels W. The drive system of the vehicle 50 is not limited to front-wheel drive illustrated in FIG. 1, and may be rear-wheel drive or four-wheel drive.

The traveling driver 140 includes a power control unit (PCU) and a motor generator (MG) (both of which are not illustrated), and causes the vehicle 50 to travel by using electric power stored in the battery 130. For example, the PCU includes a control device including a processor, an inverter, a converter, and a relay (hereinafter referred to as "system main relay (SMR)") (none of which are not illustrated). The control device of the PCU receives instructions (control signals) from the ECU 150, and controls the inverter, the converter, and the SMR of the PCU in response to the instructions. Examples of the MG include a three-phase AC motor generator. The MG is driven by the PCU to rotate the driving wheels W. The MG regenerates electric power, and supplies the generated electric power to the battery 130. The SMR switches connection and disconnection of a power path from the battery 130 to the PCU. The SMR is closed (connected) when the vehicle 50 is traveling.

The input device 160 receives an input from the user. The input device 160 is operated by the user, and outputs a signal corresponding to the user's operation to the ECU 150. The communication system may be wired or wireless. Examples of the input device 160 include various switches, various pointing devices, a keyboard, and a touch panel. The input device 160 may be an operation unit of a car navigation system. The input device 160 may be a smart speaker configured to receive a voice input.

The notification device 170 executes a predetermined notification process for the user (for example, an occupant of the vehicle 50) in response to a request from the ECU 150. The notification device 170 may include at least one of a display device (for example, a touch panel display), a loudspeaker, and an indicator (for example, a malfunction indicator lamp (MIL)). The notification device 170 may be an instrument panel, a head-up display, or a car navigation system.

The communication apparatus 180 includes various communication interfaces (I/Fs). The communication apparatus 180 may include a data communication module (DCM). The communication apparatus 180 may include a communication I/F that supports the fifth-generation mobile communication system (5G). The ECU 150 performs wireless communication with a communication device outside the vehicle 50 via the communication apparatus 180.

Figure 3:
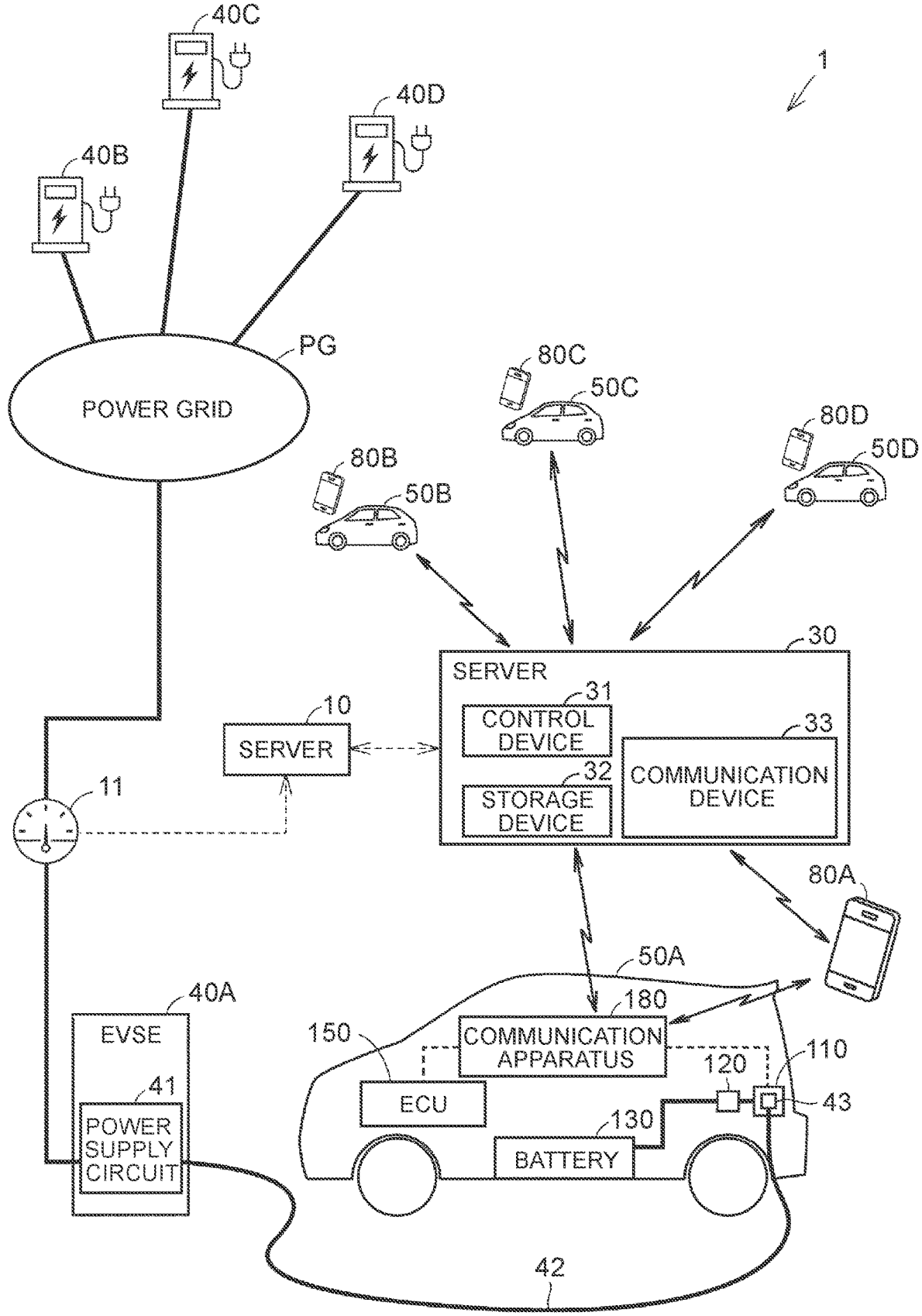
FIG. 3 is a diagram illustrating a schematic configuration of the electric power system according to the embodiment of the present disclosure.

FIG. 3 is a diagram illustrating a schematic configuration of the electric power system according to this embodiment. Referring to FIG. 3, the electric power system according to this embodiment is a vehicle grid integration (VGI) system 1. The VGI system 1 includes a power grid PG, servers 10 and 30, a smart meter 11, EVSEs 40A to 40D, vehicles 50A to 50D, and mobile terminals 80A to 80D. Each of the vehicles 50A to 50D has the configuration illustrated in FIG. 1.

In FIG. 3, the mobile terminals 80A to 80D correspond to mobile terminals carried by users of the vehicles 50A to 50D, respectively. Unless otherwise distinguished, each of the mobile terminals 80A to 80D is hereinafter referred to as "mobile terminal 80". In this embodiment, a smartphone having a touch panel display is employed as each mobile terminal 80. The mobile terminal 80 is not limited to the smartphone, and may be any mobile terminal such as a tablet terminal, a wearable device (for example, a smart watch), or an electronic key.

Although FIG. 3 illustrates four vehicles, four mobile terminals, and four EVSEs, the VGI system 1 may include any numbers of vehicles, mobile terminals, and EVSEs, independently, such as 10 or more or 100 or more. The VGI system 1 may include at least one of a privately owned vehicle (POV) and a Mobility-as-a-Service (MaaS) vehicle. The MaaS vehicle is managed by a MaaS company. The VGI system 1 may include at least one of a non-public EVSE available to only a specific user (for example, a household EVSE), and a public EVSE available to many non-specific users.

In FIG. 3, the vehicle 50A is electrically connected to the EVSE 40A. In this embodiment, the EVSE 40A is AC power supply equipment adaptable to a reverse power flow. The power supply circuit 41 converts electric power supplied from the power grid PG into electric power suited to the external power charge, and converts electric power supplied from the vehicle 50A into electric power suited to the reverse power flow. The VGI system 1 may include power supply equipment that is not adapted to the reverse power flow, or may include DC power supply equipment (for example, a quick charger). When the connector 43 of the outlet cable 42 connected to the EVSE 40A is connected to the inlet 110 of the vehicle 50A, communication can be established between the vehicle 50A and the EVSE 40A and electric power can be exchanged between the EVSE 40A and the vehicle 50A. The vehicle 50A electrically connected to the EVSE 40A is electrically connected to the power grid PG via the EVSE 40A. Thus, preparation is completed for the external power charge and the external power supply.

The communication apparatus 180 mounted on the vehicle 50A communicates with the EVSE 40A via the outlet cable 42. Any communication system may be employed between the EVSE 40A and the vehicle 50A. Examples of the communication system include a controller area network (CAN) and a programmable logic controller (PLC). The standard for the communication between the EVSE 40A and the vehicle 50A may be ISO/IEC 15118 or IEC 61851. For example, the communication apparatus 180 performs wireless communication with the server 30 via a mobile communication network (telematics). Signals to be exchanged between the communication apparatus 180 and the server 30 may be encrypted. In this embodiment, the communication apparatus 180 mounted on the vehicle 50A and the mobile terminal 80A perform wireless communication. The ECU 150 controls the mobile terminal 80A through the wireless communication to cause the mobile terminal 80A to notify the user. The communication between the communication apparatus 180 and the mobile terminal 80A may be close-proximity communication using Bluetooth (registered trademark) (for example, direct communication within a range of a cabin and periphery of the vehicle).

The smart meter 11 measures electric energy supplied from the EVSE 40A to the vehicle 50A. The smart meter 11 also measures electric energy that has flowed in reverse from the vehicle 50A to the EVSE 40A. The smart meter 11 measures power usage every time a predetermined period (for example, 30 minutes) elapses, stores the measured power usage, and transmits the power usage to the server 10. Examples of a communication protocol between the smart meter 11 and the server 10 include IEC (DLMS/COSEM). The server 10 transmits measured values of the smart meter 11 to the server 30 as needed. The server 10 may transmit the measured values periodically or in response to a request from the server 30.

Predetermined application software (hereinafter referred to simply as "application") is installed in the mobile terminal 80. The mobile terminal 80 can be carried by the user of the vehicle 50, and can exchange information with the server 30 via the application. For example, the user can operate the application via the touch panel display (not illustrated) of the mobile terminal 80. The touch panel display of the mobile terminal 80 can notify the user of the vehicle 50. Communication from the server 30 to the user of the vehicle 50 (request or notification) is directed to a predetermined communication destination (for example, the mobile terminal 80 or the communication apparatus 180).

In this embodiment, the VGI system 1 functions as a virtual power plant (VPP). The VPP is a system in which a large number of distributed energy resources (hereinafter also abbreviated as "DERs") are aggregated by a sophisticated energy management technology using Internet of things (IoT) and controlled remotely and integrally to virtually function as one power plant. An electric utility that provides an energy management service by aggregating DERs is referred to as "aggregator". For example, a power company cooperates with the aggregator to adjust demand-and-supply balance of electric power by demand response (DR).

Examples of the DER include energy resources owned by demanders (hereinafter referred to also as "demand side resources (DSRs)"). In the VGI system 1, motor vehicles including power storage devices (that is, the vehicle 50 illustrated in FIG. 1) are employed as the DSRs for implementing the VPP.

The server 10 belongs to a power transmission/distribution utility. In this embodiment, the power company serves both as a power generation utility and a power transmission/distribution utility. The power company constructs a power grid (that is, the power grid PG) by using power plants and power transmission/distribution facilities (both of which are not illustrated), and is responsible for maintenance and management of the server 10, the smart meter 11, and the power grid PG. For example, the power company can make a profit through transactions with the demanders that use electric power (for example, individuals or companies). The power grid PG according to this embodiment corresponds to an example of "power grid" according to the present disclosure.

The server 30 is communicable with the server 10, the vehicles 50A to 50D, and the mobile terminals 80A to 80D. The server 30 belongs to the aggregator. The aggregator provides services related to management of the power grid PG in response to instructions from the power company. The power company and the aggregator correspond to managers of the power grid PG. The servers 10 and 30 correspond to management computers for the power grid PG. For example, the server 10 and the server are communicable with each other via a virtual private network (VPN). The communication protocol between the server 10 and the server 30 may be OpenADR. In this embodiment, a terminal of the aggregator (for example, the server 30) is communicable with a terminal of the power company (for example, the server 10) and a terminal of the vehicle user (for example, the communication apparatus 180 or the mobile terminal 80). The VGI system 1 is not limited to such a system, and may separately include a server for communication with the power company and a server for communication with the vehicle user. Those servers may be managed by different electric utilities (for example, higher/lower-level aggregators).

The server 30 includes a control device 31, a storage device 32, and a communication device 33. The control device 31 includes a processor to execute predetermined information processes and control the communication device 33. The storage device 32 can save various types of information. The storage device 32 stores programs to be executed by the control device 31 and information for use in the programs (for example, maps, mathematical expressions, and various parameters). The communication device 33 includes various communication I/Fs. The control device 31 communicates with the outside via the communication device 33.

In this embodiment, the server 30 and the EVSE 40 do not communicate with each other, but may be communicable with each other. The server 30 may communicate with the vehicle 50 via the EVSE 40. The EVSE 40 may be communicable with an EVSE management cloud. The communication protocol between the EVSE 40 and the EVSE management cloud may be an open charge point protocol (OCPP).

The server 10 levels electric power by using DR. To level electric power, the server 10 first selects any number of aggregators necessary for the electric power leveling from among a plurality of aggregators, and requests the selected aggregators to participate in the DR. For example, the server 10 transmits, to the server 30, a signal for requesting participation in the DR (hereinafter referred to also as "DR request signal"). The DR request signal contains a target area of the DR, a type of the DR (for example, negative DR or positive DR), a DR amount of the aggregators, and a DR period. The DR amount is a power adjustment amount that is requested by the power company for the aggregators. The DR period is information indicating a DR start time and a DR end time. The server 10 may include a control device, a storage device, and a communication device. The control device may include a processor to execute predetermined information processes and control the communication device. The storage device can save various types of information. The storage device may store programs to be executed by the control device and information for use in the programs (for example, maps, mathematical expressions, and various parameters). The communication device may include various communication I/Fs. The control device may communicate with the outside via the communication device.

The server 30 selects any number of DR vehicles necessary to respond to the request of the DR request signal. The DR vehicle is a vehicle 50 that participates in the DR. The DR vehicle is selected from among the vehicles 50 belonging to the users who have exchanged contracts with the aggregators in advance. The users who have exchanged the contracts can receive a predetermined incentive by performing charging or discharging in response to requests from the aggregators. The user who does not respond to the request despite acceptance of the request has a predetermined penalty under the contract.

In this embodiment, when the selection of the DR vehicles is completed, the server 30 determines a charge/discharge schedule of each DR vehicle, and transmits, to the DR vehicle, a schedule signal indicating a DR period of the DR vehicle. When a DR start time set for the DR vehicle has arrived, the server 30 transmits a charge/discharge command (more specifically, a command for causing the DR vehicle to control charge and discharge in accordance with the determined charge/discharge schedule) to the DR vehicle to adjust electric power requested by the DR request signal. During the DR period indicated by the DR request signal, the server 30 may check whether each DR vehicle is executing charge and discharge in response to the charge/discharge command. When the server 30 determines that any DR vehicle does not follow the charge/discharge command, the server 30 may transmit the charge/discharge command to a newly selected DR vehicle to compensate for a deficiency in the power adjustment amount.

The server 30 may use a predetermined electric energy meter to measure a power adjustment amount of each DR vehicle (for example, charged electric energy or discharged electric energy in a predetermined period). The predetermined electric energy meter may be the smart meter 11 or an electric energy meter mounted on the vehicle 50 (for example, the monitoring module 121). The electric energy meter may be installed at any place. The EVSE 40 may include the electric energy meter. The electric energy meter may be attached to the portable outlet cable.

Figure 4:
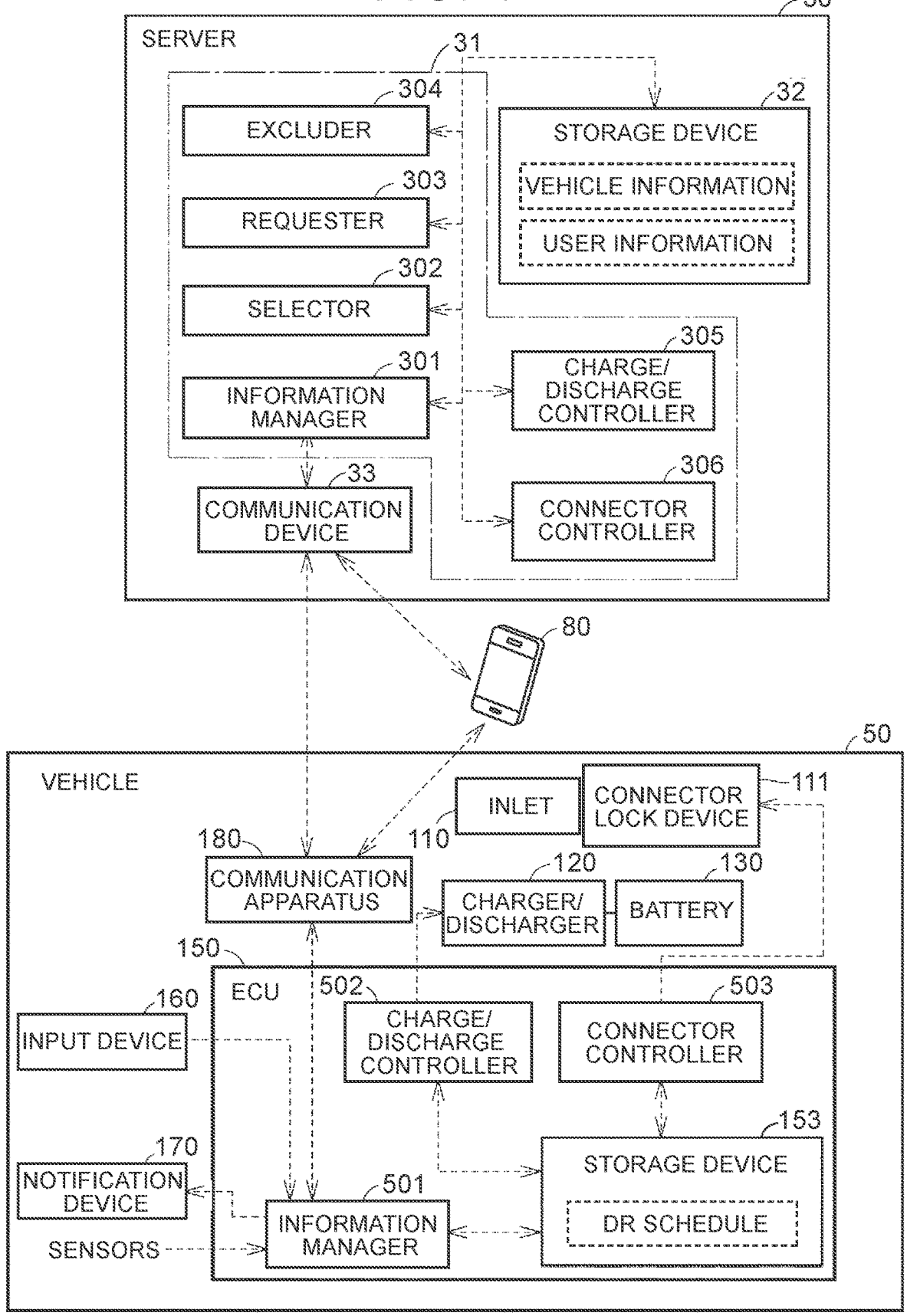
FIG. 4 is a diagram illustrating detailed configurations of a vehicle control device and a server in the electric power system according to the embodiment of the present disclosure.

FIG. 4 is a diagram illustrating detailed configurations of the ECU 150 of the vehicle 50 and the server 30. Referring to FIG. 4 together with FIG. 1 and FIG. 3, the ECU 150 includes an information manager 501, a charge/discharge controller 502, and a connector controller 503. In the ECU 150 according to this embodiment, the individual components are implemented by the processor 151 illustrated in FIG. 1 and the programs to be executed by the processor 151 (for example, the programs stored in the storage device 153). The implementation method is not limited to this method, and the components may be implemented by dedicated hardware (electronic circuit).

The information manager 501 updates information in the storage device 153 (for example, a traveling schedule, a charging schedule, and a DR schedule) based on provided information. The information manager 501 causes the notification device 170 to notify the user about predetermined information. An output signal of the input device 160, detection results from various sensors mounted on the vehicle 50, and information received by the communication apparatus 180 from the outside of the vehicle 50 are input to the information manager 501.

The traveling schedule is information indicating a traveling start time and a traveling end time scheduled by the user, and can be registered in the storage device 153 by the user via the input device 160. When no traveling schedule is registered, information indicating that the traveling schedule is "absent" is stored in the storage device 153. The charging schedule is information indicating a schedule of charging intended by the user, and can be registered in the storage device 153 by the user via the input device 160. When no charging schedule is registered, information indicating that the charging schedule is "absent" is stored in the storage device 153. The DR schedule is information indicating a DR period set for the vehicle 50. When a schedule signal is received from the server 30, the information manager 501 updates the DR schedule in the storage device 153. In the vehicle 50 that is not selected as the DR vehicle, information indicating that the DR schedule is "absent" is stored in the storage device 153.

The information manager 501 transmits the traveling schedule and the charging schedule to the server 30. The information manager 501 acquires conditions of the vehicle 50 (for example, an outlet cable connection status, a connector locking/unlocking status, and a SOC of the battery 130), and transmits the acquired conditions to the server 30. The outlet cable connection status is information indicating whether the connector 43 of the outlet cable 42 is connected to the inlet 110. The connector locking/unlocking status is information indicating whether the connector 43 connected to the inlet 110 is locked or unlocked. Those pieces of information are transmitted to the server 30 together with a vehicle ID described later. The transmission timing may be set arbitrarily. The information manager 501 may sequentially transmit the predetermined information to the server 30 in a predetermined cycle. Alternatively, the information manager 501 may transmit the data stored in the storage device 153 to the server 30 at a predetermined timing (for example, when traveling of the vehicle 50 is terminated or when the connector 43 is connected).

In this embodiment, when a request to participate in the DR is sent from the server 30, the information manager 501 responds to the server 30 about whether to accept the request. More specifically, when the communication apparatus 180 receives the request, the information manager 501 controls the notification device 170 to prompt the user of the vehicle 50 to give an answer. When the user of the vehicle 50 inputs, to the input device 160, information indicating whether to accept the request, the information manager 501 replies to the server 30 about the user's determination result (whether to accept the request). In a case where the request is transmitted to the mobile terminal 80, the mobile terminal 80 may have the function related to the response.

The charge/discharge controller 502 controls the charger/discharger 120 to control charge and discharge of the battery 130. When an external power charge start condition is satisfied in a state in which preparation of the external power charge is completed, the charge/discharge controller 502 starts the external power charge. When an external power supply start condition is satisfied in a state in which preparation of the external power supply is completed, the charge/discharge controller 502 starts the external power supply. Each of the external power charge start condition and the external power supply start condition may be satisfied when the user performs a predetermined starting operation or when a start time set by the user has arrived. The charge/discharge control for the battery 130 is basically executed based on a program installed in the ECU 150. In the DR period, the charge/discharge controller 502 is remotely operated by the server 30. Therefore, the charge/discharge control for the battery 130 is executed by the server 30 in the DR period. The charge/discharge controller 502 may switch permission/prohibition of the remote operation. The user may switch the permission/prohibition of the remote operation via the input device 160. The remote operation on the charge/discharge controller 502 by the server 30 may be permitted when the user of the vehicle 50 accepts the DR participation request from the server 30.

The connector controller 503 controls the connector lock device 111 to execute connector control (that is, locking/unlocking control for the connector 43 connected to the inlet 110). When a connector control request (connector locking request or connector unlocking request) is made, the connector controller 503 executes the connector control in response to the request. In this embodiment, at least one of the input device 160 and the mobile terminal 80 receives the connector control request from the user. When the connector control request is input to the input device 160 or the mobile terminal 80 from the user, the connector controller 503 executes the connector control in response to the request input from the user. When the communication apparatus 180 receives the connector control request from the server 30, the connector controller 503 executes the connector control in response to the request received from the server 30.

Figure 10:
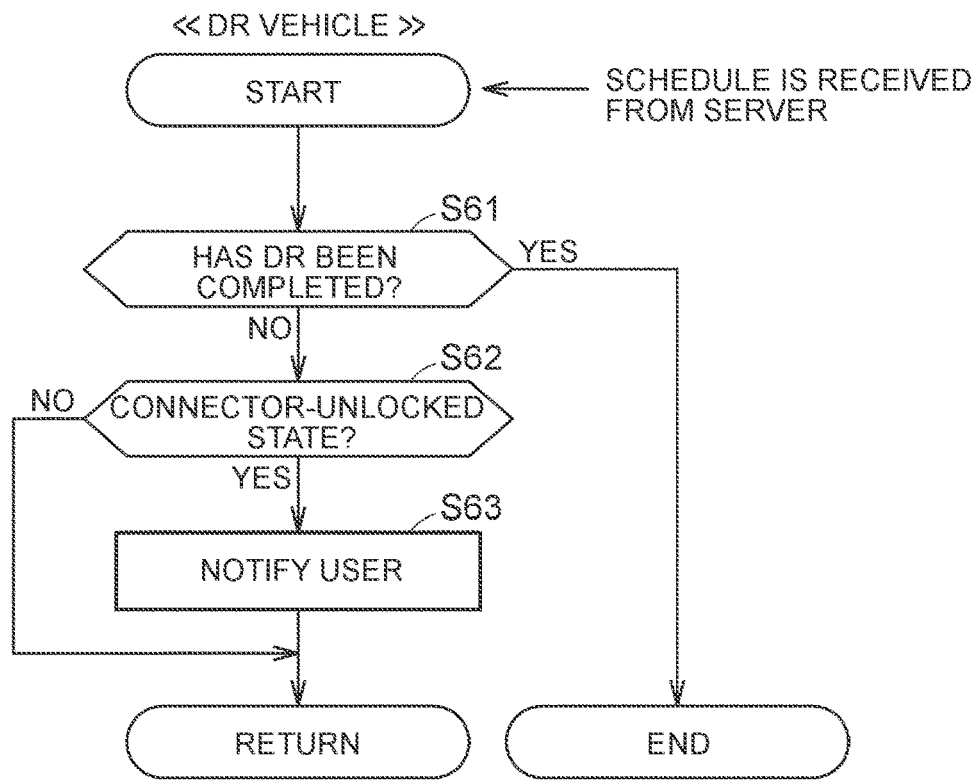
FIG. 10 is a flowchart illustrating processes related to monitoring of a connector status to be executed by the vehicle control device of each DR vehicle in the electric power system according to the embodiment of the present disclosure.

In this embodiment, when a predetermined condition is satisfied, the connector controller 503 controls the notification device 170 to prompt the user of the vehicle 50 to bring the vehicle 50 into the connector-locked state (see FIG. 10).

The control device 31 of the server 30 includes an information manager 301, a selector 302, a requester 303, an excluder 304, a charge/discharge controller 305, and a connector controller 306. In the server 30 according to this embodiment, the individual components are implemented by the processor of the control device 31 illustrated in FIG. 3 and the programs to be executed by the processor (for example, the programs stored in the storage device 32). The implementation method is not limited to this method, and the components may be implemented by dedicated hardware (electronic circuit).

The information manager 301 manages information on each registered user (hereinafter referred to also as "user information") and information on each registered vehicle 50 (hereinafter referred to also as "vehicle information"). The user information and the vehicle information are stored in the storage device 32.

Identification information for identifying each user (hereinafter referred to also as "user ID") is assigned to the user. The information manager 301 manages the user information while distinguishing the user information based on the user ID. The user ID also functions as information for identifying the mobile terminal 80 carried by the user (terminal ID). The user information contains a communication address of the mobile terminal 80 carried by the user and a vehicle ID of the vehicle 50 belonging to the user. The user information may contain incentive earnings. The incentive earnings are the total amount of incentives earned by the user participating in DR in the predetermined period.

The vehicle ID is identification information for identifying the vehicle 50. The vehicle ID is assigned to each vehicle 50. The information manager 301 manages the vehicle information while distinguishing the vehicle information based on the vehicle ID. The vehicle information contains a communication address of the communication apparatus 180 mounted on the vehicle 50 and vehicle information received from each vehicle 50 (for example, a traveling schedule, a charging schedule, an outlet cable connection status, a connector locking/unlocking status, and a SOC of the battery 130).

When a DR request signal is received from the server 10 (FIG. 3), the information manager 301 saves the DR request signal in the storage device 32. The selector 302 selects DR vehicles based on the DR request signal. The selector 302 may select the DR vehicles in consideration of the outlet cable connection status, the SOC of the battery 130, the traveling schedule, and the charging schedule. The excluder 304 excludes, from candidates for the DR vehicle, vehicles 50 that do not satisfy a predetermined requirement. The excluder 304 may exclude, from the candidates for the DR vehicle, a vehicle 50 that prohibits the remote operation on the charge/discharge controller 502. The requester 303 generates a charge/discharge command for each DR vehicle based on the DR request signal. The requester 303 may generate the charge/discharge command for each DR vehicle in consideration of conditions of each DR vehicle. The information manager 301 transmits the charge/discharge command generated by the requester 303 to each DR vehicle selected by the selector 302. Through the processes described above, the charge/discharge command is transmitted from the server 30 to each DR vehicle in a DR period indicated by the DR request signal.

The charge/discharge controller 305 controls charge and discharge of the battery 130 mounted on each DR vehicle through processes illustrated in FIG. 7 as described later. The connector controller 306 controls the connector of each DR vehicle through processes illustrated in FIG. 6 and FIG. 7 as described later.

Figure 5:
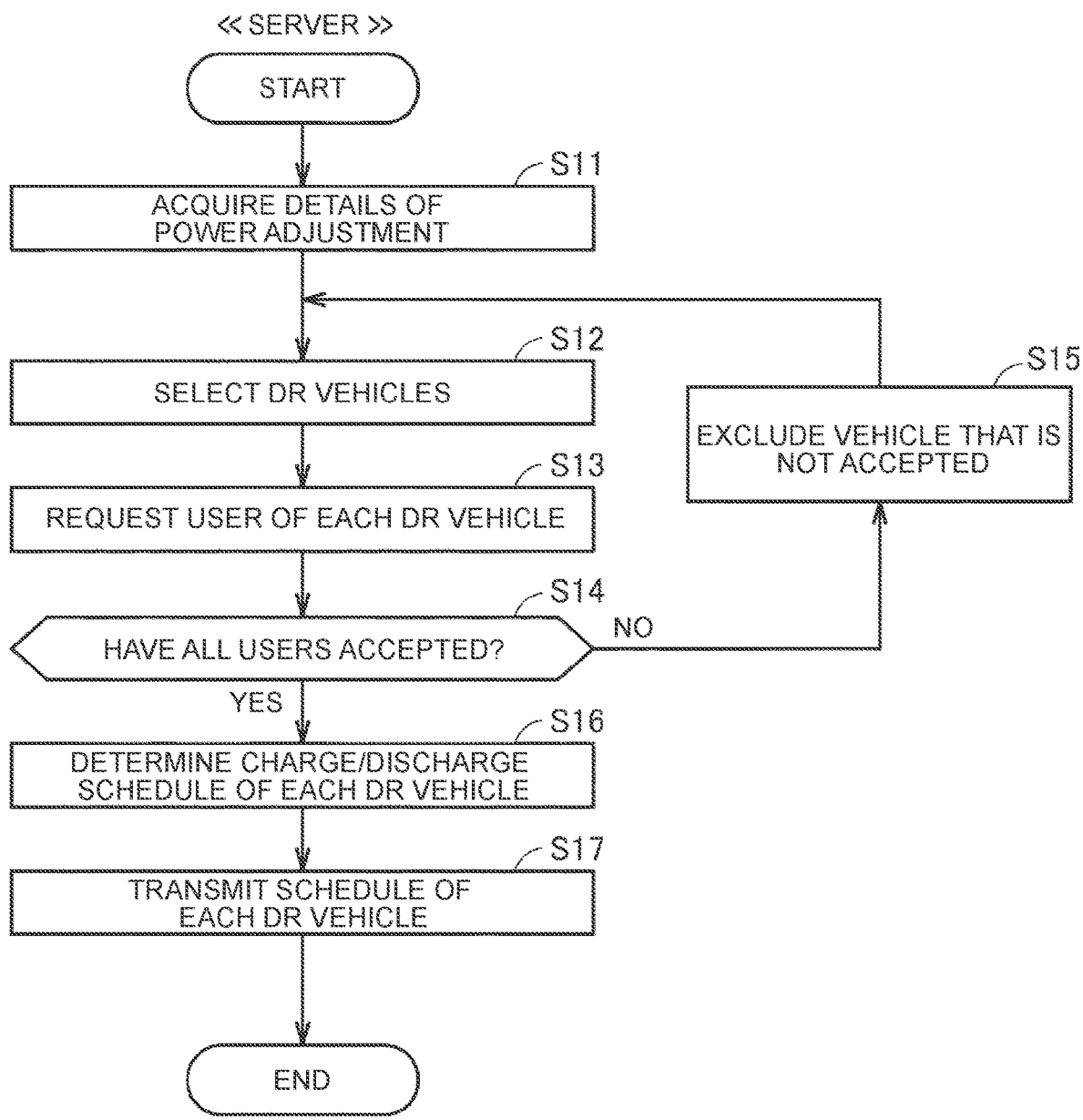
FIG. 5 is a flowchart illustrating processes to be executed when a management computer for a power grid according to the embodiment of the present disclosure executes demand-and-supply adjustment in the power grid.

FIG. 5 is a flowchart illustrating processes to be executed when the server executes demand-and-supply adjustment in the power grid PG. The processes in this flowchart are executed by the server 30 when the server 30 executes power adjustment by using DR (that is, demand-and-supply adjustment in the power grid PG).

Referring to FIG. 5 together with FIG. 1 to FIG. 4, in Step (hereinafter represented simply by "S") 11, the selector 302 acquires details of the power adjustment (for example, details of a DR request signal). The details of the power adjustment include a type of the DR (positive DR or negative DR), a power adjustment amount, a target area of the DR, and a DR period.

In S12, the selector 302 selects DR vehicles from among vehicles 50 that satisfy the predetermined requirement (candidates for DR vehicle). The predetermined requirement may be determined based on at least one of a traveling schedule, a charging schedule, an outlet cable connection status, and a SOC of the battery 130 of each vehicle 50. In this embodiment, the predetermined requirement includes electric connection between the vehicle 50 and the power grid PG. Therefore, a vehicle 50 in which the connector 43 is not connected to the inlet 110 is excluded from the candidates for the DR vehicle.

In S13, the requester 303 requests a user of each DR vehicle selected in S12 to participate in the DR and execute demand-and-supply adjustment in the power grid PG. For example, the request is made at a timing earlier than the DR start time by a predetermined period. In this embodiment, the request timing is earlier than the DR start time by several hours.

The requester 303 transmits a signal indicating details of the request to the user of each DR vehicle, and requests the user to give an answer to whether to accept the request (answerback). In this embodiment, the request is transmitted to the communication apparatus 180 mounted on the DR vehicle. The destination of the request is not limited to the communication apparatus 180, and the request from the requester 303 to the user may be transmitted to the mobile terminal 80 carried by the user of the DR vehicle.

In S14, the excluder 304 determines whether the users of all the DR vehicles have answered the acceptance of the request. For example, this determination is made at a timing when answers have been received from all the users or when a predetermined period (for example, 1 minute to 15 minutes) has elapsed after the request. In this embodiment, a user who does not transmit the answer even when the predetermined period has elapsed after the request is handled as a user who has answered non-acceptance of the request.

When the determination result is "NO" in S14 (any user does not accept the request), the excluder 304 excludes, in S15, the vehicle 50 belonging to the user who does not accept the request from the candidates for the DR vehicle. Then, the process returns to S12. The vehicle 50 excluded in S15 is not selected in S12.

When the determination result is "YES" in S14 (all the users accept the request), the requester 303 determines, in S16, a charge/discharge schedule of each DR vehicle (for example, a charging profile or a discharging profile in the DR period), and saves the vehicle ID and the charge/discharge schedule of each DR vehicle in the storage device 32 while linking the vehicle ID and the charge/discharge schedule together. In S17, the requester 303 transmits a schedule signal indicating the DR period of each DR vehicle to the user of the DR vehicle. In this embodiment, the schedule signal is transmitted to both the communication apparatus 180 mounted on the DR vehicle and the mobile terminal 80 carried by the user of the DR vehicle. By executing the process of S17, the series of processes illustrated in FIG. 5 is terminated.

In this embodiment, the determination of "YES" in S14 confirms that each DR vehicle selected by the selector 302 participates in the DR (demand-and-supply adjustment in the power grid PG). This means that the manager of the power grid PG and the user of the vehicle 50 agree to fulfill an incentive contract exchanged between the manager and the user. The user of the DR vehicle that has confirmed the participation can earn an incentive by fulfilling the contract. More specifically, the user of the DR vehicle that has confirmed the participation can receive the incentive from the aggregator by causing the DR vehicle to wait with the connector 43 connected to the inlet 110 so that the server 30 can control exchange of electric power between the power grid PG and the battery 130 by using a charge/discharge command in the DR period indicated by the schedule signal (S17). A penalty is imposed on the user who does not fulfill the contract after the participation has been confirmed.

Figure 6:
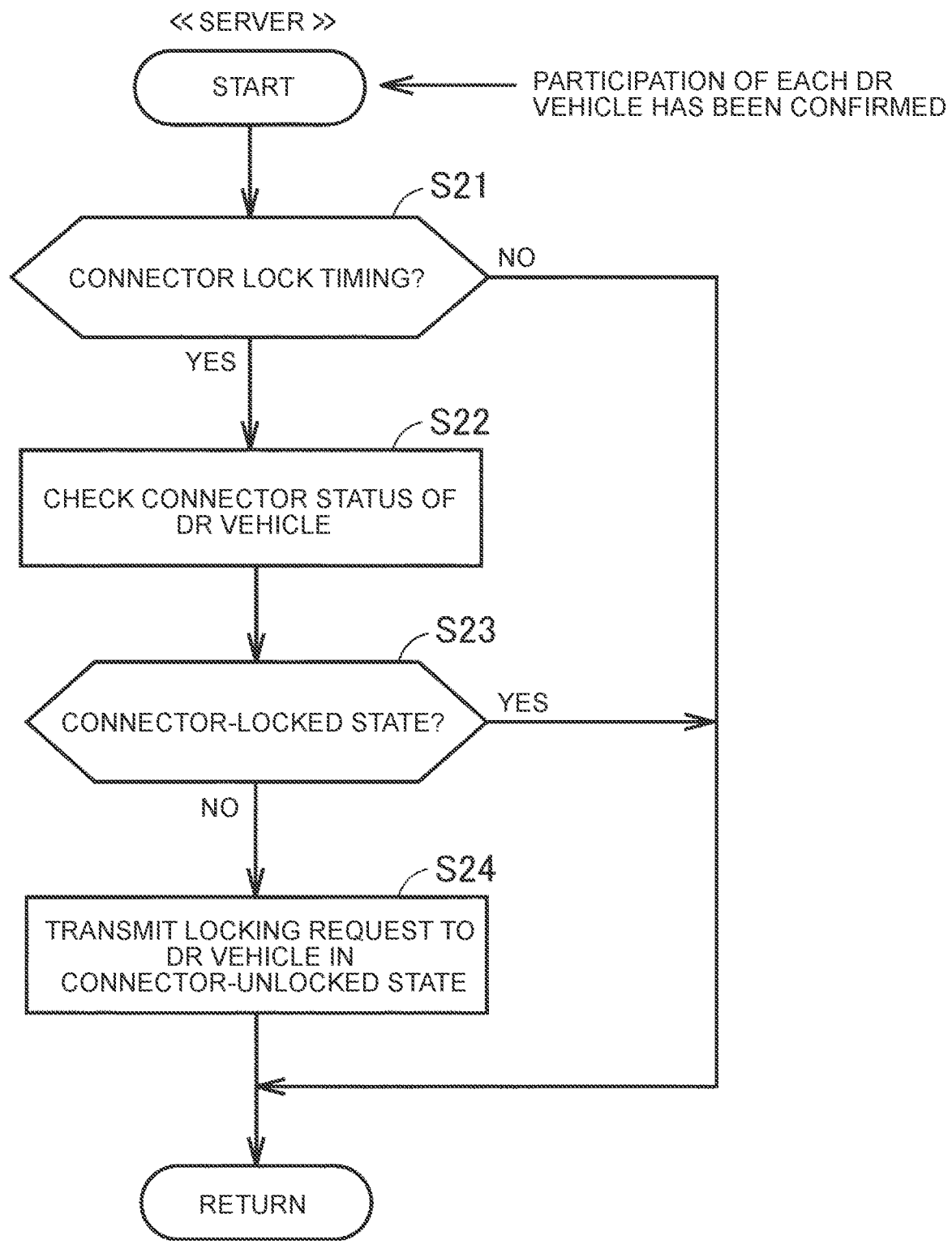
FIG. 6 is a flowchart illustrating processes to be executed when the management computer for the power grid according to the embodiment of the present disclosure executes connector locking control for a DR vehicle.

FIG. 6 is a flowchart illustrating processes to be executed when the server executes connector locking control for the DR vehicle. The processes in this flowchart are started at a timing when the participation of each DR vehicle has been confirmed. The processes illustrated in FIG. 6 are repeatedly executed for each DR vehicle that has confirmed the participation. When the DR period set for the DR vehicle has elapsed, the processes are not executed for the DR vehicle. When the DR period has elapsed, the DR vehicle turns into a non-DR vehicle (that is, a vehicle 50 that is not the DR vehicle).

Referring to FIG. 6 together with FIG. 1 to FIG. 4, the connector controller 306 determines in S21 whether a predetermined connector lock timing has come. The connector lock timing can be set arbitrarily as long as the participation has been confirmed at that timing. The connector lock timing may be the timing when the participation has been confirmed (hereinafter referred to also as "first lock timing"), or a timing earlier than the DR start time by a predetermined period (for example, 10 minutes to 30 minutes) (hereinafter referred to also as "second lock timing"). The connector lock timing may be the timing when the schedule signal is transmitted in S17 of FIG. 5.

When the predetermined connector lock timing has come ("YES" in S21), the connector controller 306 checks a connector status of the DR vehicle in S22. More specifically, the connector controller 306 checks a connector locking/unlocking status of each DR vehicle. In S23, the connector controller 306 determines whether the DR vehicle is in the connector-locked state. When the DR vehicle is in the connector-unlocked state ("NO" in S23), the connector controller 306 transmits a connector locking request to the DR vehicle in S24. The connector locking request is transmitted to the DR vehicles in the connector-unlocked state through the process of S24 until all the DR vehicles come into the connector-locked state.

The predetermined connector lock timing in S21 may be changed as appropriate. For example, both the first and second lock timings may serve as the connector lock timings. In a configuration in which both the first and second lock timings are set as the connector lock timings, when any DR vehicle is in the connector-unlocked state at the first lock timing, the process of S24 is executed to bring all the DR vehicles into the connector-locked state. When any DR vehicle is brought into the connector-unlocked state by the user after the first lock timing and before the second lock timing, the process of S24 is executed again at the second lock timing to bring all the DR vehicles into the connector-locked state.

Figure 7:
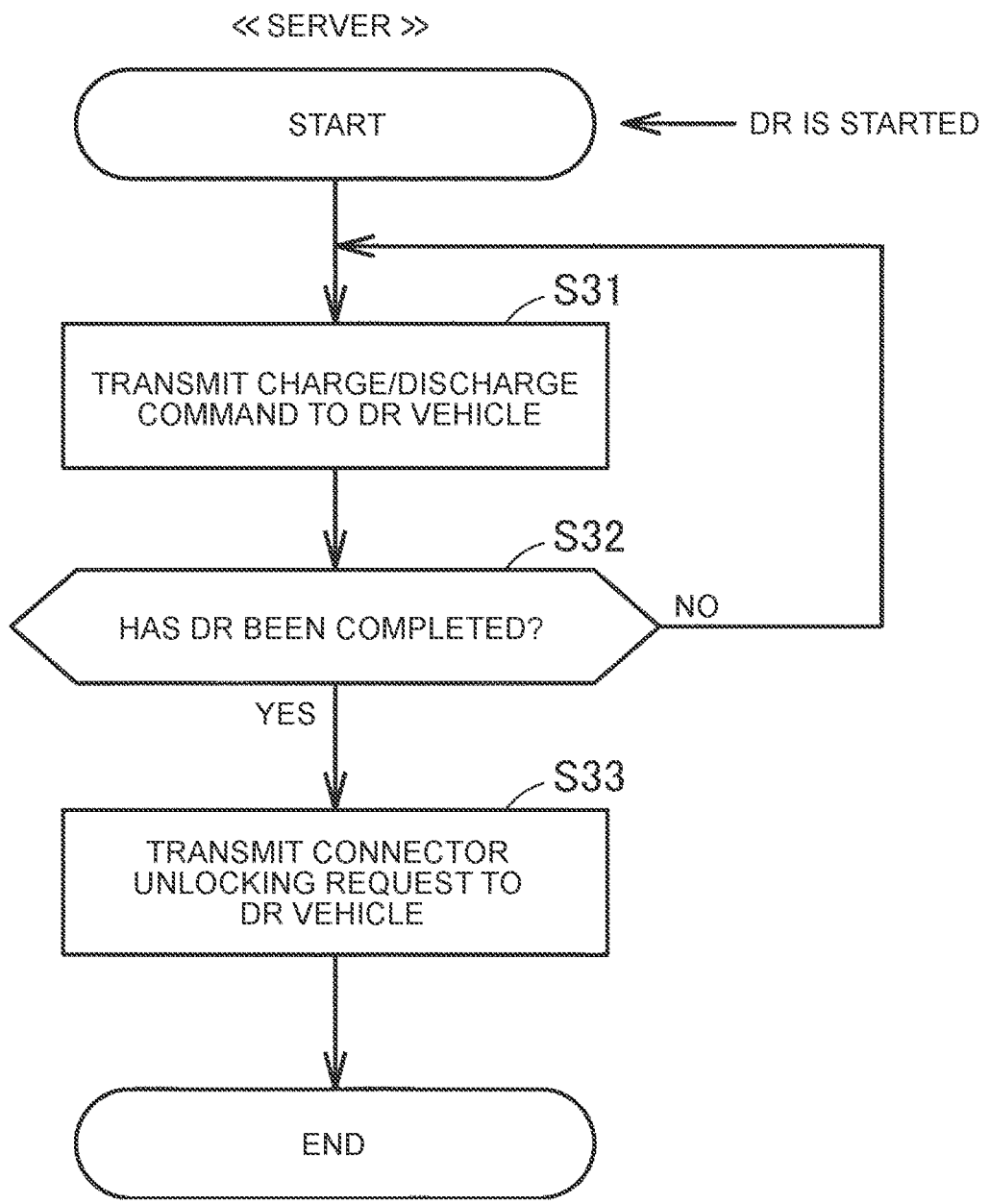
FIG. 7 is a flowchart illustrating processes to be executed when the management computer for the power grid according to the embodiment of the present disclosure controls charge and discharge of the DR vehicle.

FIG. 7 is a flowchart illustrating processes to be executed when the server controls charge and discharge of the DR vehicle. The processes in this flowchart are executed for each DR vehicle. The processes illustrated in FIG. 7 are started at the DR start time set for the DR vehicle.

Referring to FIG. 7 together with FIG. 1 to FIG. 4, the charge/discharge controller 305 transmits a charge/discharge command to the DR vehicle in S31. In S32, the charge/discharge controller 305 determines whether the DR end time has come. In the DR period (that is, the period from the DR start time to the DR end time), the charge/discharge command is transmitted from the server 30 to the DR vehicle through the process of S31. When the request from the server 30 is increase or reduction of power demand, a charging command (including a charging prohibition command) is transmitted from the server 30 to the DR vehicle. When the request from the server 30 is the reverse power flow, a discharging command is transmitted from the server 30 to the DR vehicle.

When the DR end time has come ("YES" in S32), the connector controller 306 transmits a connector unlocking request to the DR vehicle in S33. Thus, time and effort to unlock the connector after completion of the DR are saved, thereby improving user's convenience. By executing the process of S33, the series of processes illustrated in FIG. 7 is terminated.

Figure 8:
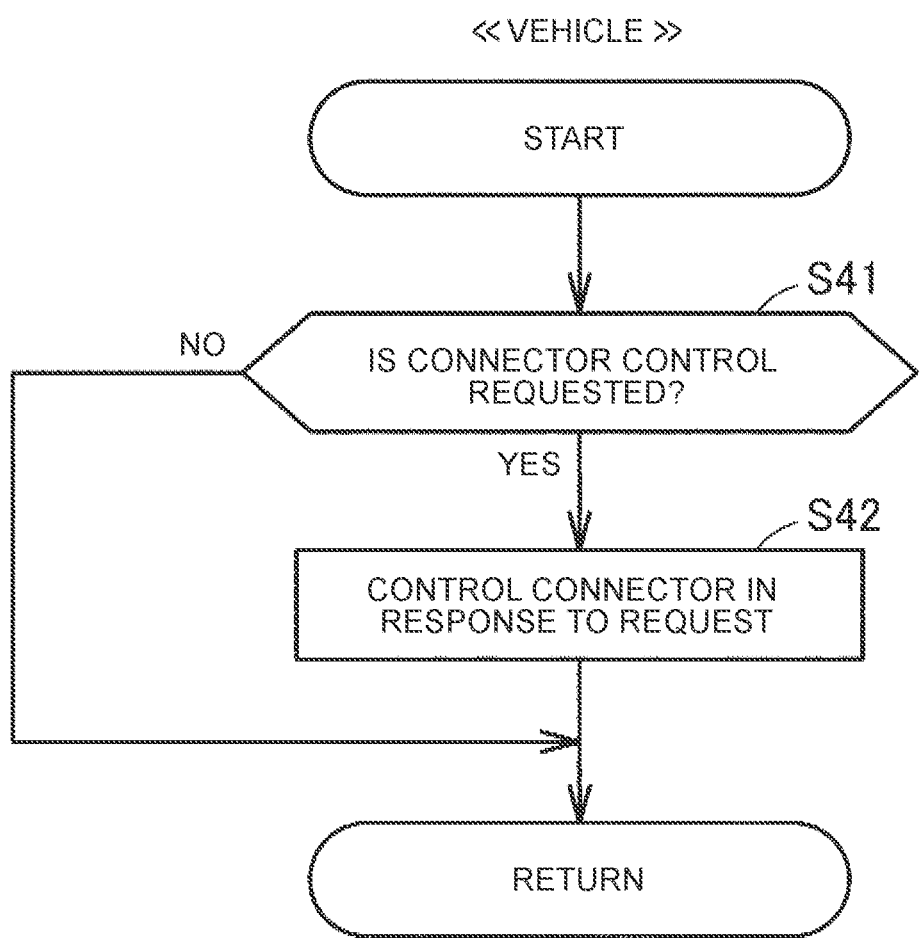
FIG. 8 is a flowchart illustrating processes related to connector control to be executed by each vehicle control device in the electric power system according to the embodiment of the present disclosure.

FIG. 8 is a flowchart illustrating processes related to connector control to be executed by the ECU 150 of each vehicle 50. For example, the processes in this flowchart are repeatedly executed in a state in which the connector 43 is connected to the inlet 110. When the connector 43 is detached from the inlet 110, the processes are not executed.

Referring to FIG. 8 together with FIG. 1 to FIG. 4, the connector controller 503 determines in S41 whether a connector control request is received. When the connector controller 503 receives the connector control request ("YES" in S41), the connector controller 503 executes connector control in response to the request in S42.

The connector controller 503 may receive the connector control request from the server 30 (see, for example, S24 of FIG. 6 or S33 of FIG. 7) or from the user. When a connector locking request is received, the connector controller 503 locks the connector 43 connected to the inlet 110 in S42. When a connector unlocking request is received, the connector controller 503 unlocks the connector 43 connected to the inlet 110 in S42.

Figure 9:
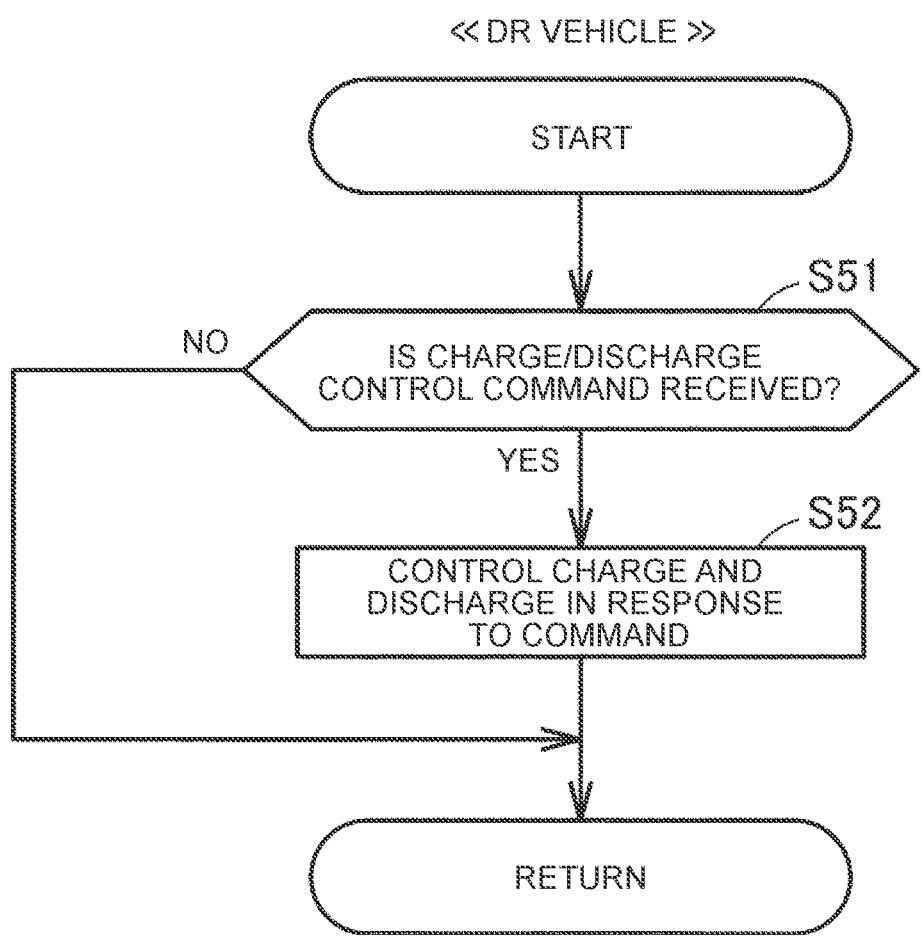
FIG. 9 is a flowchart illustrating charge/discharge control for a power storage device to be executed by the vehicle control device of each DR vehicle in the electric power system according to the embodiment of the present disclosure.

FIG. 9 is a flowchart illustrating charge/discharge control for the battery 130 to be executed by the ECU 150 of each DR vehicle. For example, the processes in this flowchart are repeatedly executed by the ECU 150 of the DR vehicle in the DR period. When the DR period has elapsed, the processes are not executed.

Referring to FIG. 9 together with FIG. 1 to FIG. 4, the charge/discharge controller 502 waits for a charge/discharge command (see, for example, S31 of FIG. 7) from the server 30 in S51. When the charge/discharge command is received from the server 30 ("YES" in S51), the charge/discharge controller 502 controls charge and discharge of the battery 130 in response to the charge/discharge command in S52. The processes of S51 and S52 are repeatedly executed while the ECU 150 of the DR vehicle is receiving the charge/discharge command continuously from the server 30.

FIG. 10 is a flowchart illustrating processes related to monitoring of the connector status to be executed by the ECU 150 of each DR vehicle. For example, the processes in this flowchart are started when the communication apparatus 180 of the DR vehicle receives a schedule signal (see, for example, S17 of FIG. 5).

Referring to FIG. 10 together with FIG. 1 to FIG. 4, the connector controller 503 determines in S61 whether the DR end time has come. When the DR end time has not come ("NO" in S61), the connector controller 503 determines in S62 whether the DR vehicle is in the connector-unlocked state. When the DR vehicle is in the connector-locked state ("NO" in S62), the process returns to the first step (S61). When the DR vehicle is in the connector-unlocked state ("YES" in S62), the connector controller 503 controls the notification device 170 in S63 to prompt the user of the DR vehicle to lock the connector (that is, bring the vehicle 50 into the connector-locked state). For example, the connector controller 503 may cause the notification device 170 to display a message "Please lock the connector 43 of the outlet cable." The notification device 170 may output a predetermined sound (including voice) to prompt the user of the DR vehicle to lock the connector. After the process of S63, the process returns to the first step (S61). When the DR end time has come ("YES" in S61), the series of processes illustrated in FIG. is terminated.

In this embodiment, the DR vehicle comes into the connector-locked state (S42 of FIG. 8) in response to the request from the server 30 (S24 of FIG. 6) before the start of the DR. When the connector unlocking (that is, the operation of bringing the vehicle 50 into the connector-unlocked state) is then executed (S42 of FIG. 8) in response to the request from the user of the DR vehicle, the DR vehicle comes into the connector-unlocked state. Therefore, the ECU 150 of the DR vehicle executes the processes illustrated in FIG. 10. In the processes illustrated in FIG. 10, when the DR vehicle comes into the connector-unlocked state before the DR end time comes, the user is prompted to lock the connector through the process of S63. This configuration suppresses detachment of the connector 43 from the inlet 110 before the end of the DR.

As described above, in the VGI system 1 (electric power system) according to this embodiment, the ECU 150 (vehicle control device) controls the vehicle 50 in which electric power can be exchanged between the power grid PG (power grid) and the battery 130 (power storage device) such that the connector 43 electrically connected to the power grid PG is connected to the inlet 110. When the vehicle 50 has confirmed the participation in the demand-and-supply adjustment in the power grid PG, the server 30 (management computer for power grid) requests the vehicle 50 to execute the connector locking control for locking the connector 43 connected to the inlet 110 (see FIG. 6). This configuration suppresses detachment of the connector 43 from the inlet 110 of the vehicle 50 after the vehicle 50 has confirmed the participation in the demand-and-supply adjustment in the power grid PG.

When the DR (demand-and-supply adjustment in the power grid PG) is completed, the vehicle 50 is requested to execute the connector unlocking control for unlocking the connector 43 connected to the inlet 110 (see FIG. 7). Thus, the user's time and effort to unlock the connector 43 after the completion of the DR are saved, thereby improving the user's convenience.

A connector locking control method according to this embodiment includes a request step, a response step, and a connector locking step described below.

In the request step, the server 30 requests the user of the vehicle 50 for the demand-and-supply adjustment in the power grid PG (see S13 of FIG. 5). In the response step, the user of the vehicle 50 responds to the server 30 about whether to accept the request (see S14 of FIG. 5). In the connector locking step, the vehicle 50 executes the connector locking control for locking the connector 43 connected to the inlet 110 at the predetermined connector lock timing after the user of the vehicle 50 has sent the response to accept the request (see FIG. 6 and FIG. 8).

The connector locking control method suppresses detachment of the connector 43 from the inlet 110 of the vehicle 50 after the vehicle 50 has confirmed the participation in the demand-and-supply adjustment in the power grid PG.

In the embodiment described above, the participation is confirmed at the timing when the user of the vehicle 50 has sent the response to accept the request from the aggregator (manager of the power grid). The timing is not limited to this timing, and the participation may be confirmed at a timing when a first time margin set after the acceptance of the request has elapsed. A first modified example is described below with reference to FIG. 11 and FIG. 12.

Figure 11:
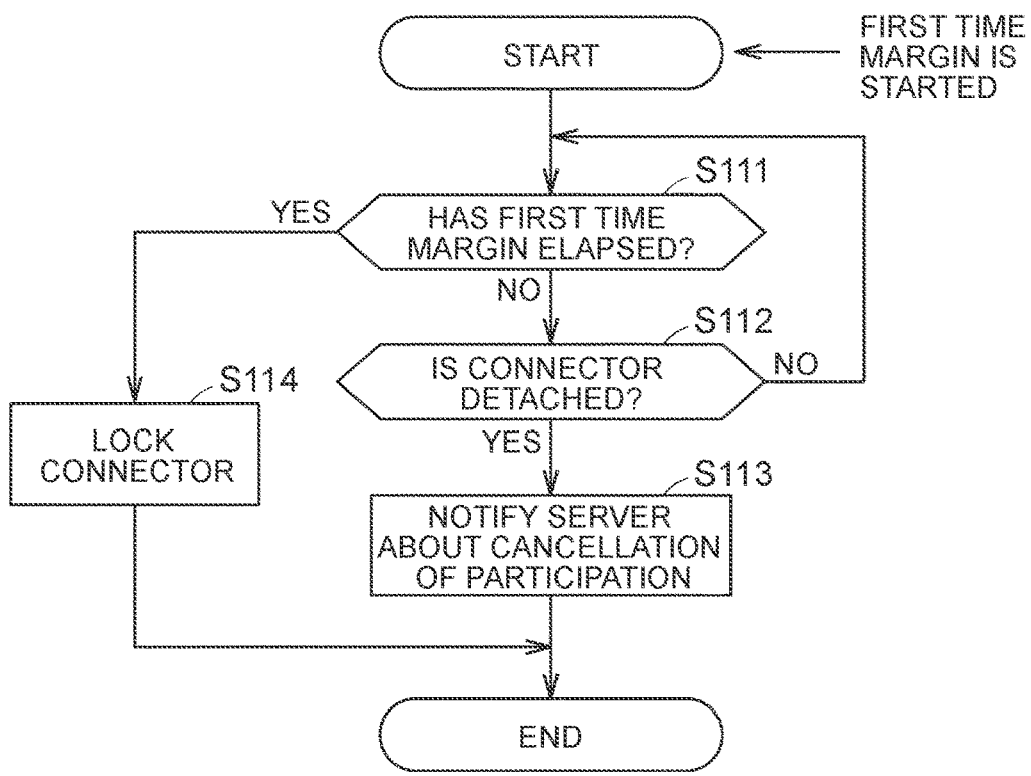
FIG. 11 is a flowchart illustrating processes to be executed by the vehicle control device of each DR vehicle in a first modified example.

FIG. 11 is a flowchart illustrating processes to be executed by the ECU 150 of each DR vehicle in the first modified example. The processes in this flowchart are started at a start timing of the first time margin. In this modified example, the first time margin is a predetermined period (for example, 10 minutes to 30 minutes) from a timing when the user of the vehicle 50 has sent the response to accept the DR participation request from the server 30 (see, for example, S13 of FIG. 5). The processes illustrated in FIG. 11 are started when the user of the vehicle 50 sends the response of the acceptance. When the processes illustrated in FIG. 11 are started, the vehicle 50 is in a connector-connected state (that is, a state in which the connector 43 is connected to the inlet 110) (see S12 of FIG. 5). The first time margin may be transmitted from the server 30 to the DR vehicle in S13 of FIG. 5 or determined under a contract in advance. In this modified example, the server 30 does not execute the processes related to the connector lock (that is, the processes illustrated in FIG. 6), but the vehicle executes the processes related to the connector lock.

Referring to FIG. 11 together with FIG. 1 to FIG. 4, the ECU 150 determines in S111 whether the first time margin has elapsed. When the first time margin has not elapsed ("NO" in S111), the ECU 150 determines in S112 whether the connector 43 is detached from the inlet 110. For example, the ECU 150 can make the determination in S112 based on a detection result from the connection sensor 111b.

When the connector 43 is detached from the inlet 110 within the first time margin ("YES" in S112), the ECU 150 transmits, in S113, a DR participation canceling notification (that is, a signal indicating that the vehicle does not participate in the demand-and-supply adjustment in the power grid PG) to the server 30 together with the vehicle ID. By executing the process of S113, the series of processes illustrated in FIG. 11 is terminated.

When the first time margin has elapsed ("YES" in S111) in a state in which the connector 43 is not detached from the inlet 110 within the first time margin ("NO" in S112), the ECU 150 controls the connector lock device 111 in S114 to lock the connector. By executing the process of S114, the series of processes illustrated in FIG. 11 is terminated.

In this modified example, the determination of "YES" in S111 confirms that the DR vehicle participates in the DR (demand-and-supply adjustment in the power grid PG). At the timing when the participation has been confirmed, the ECU 150 of the DR vehicle locks the connector (S114).

Figure 12:
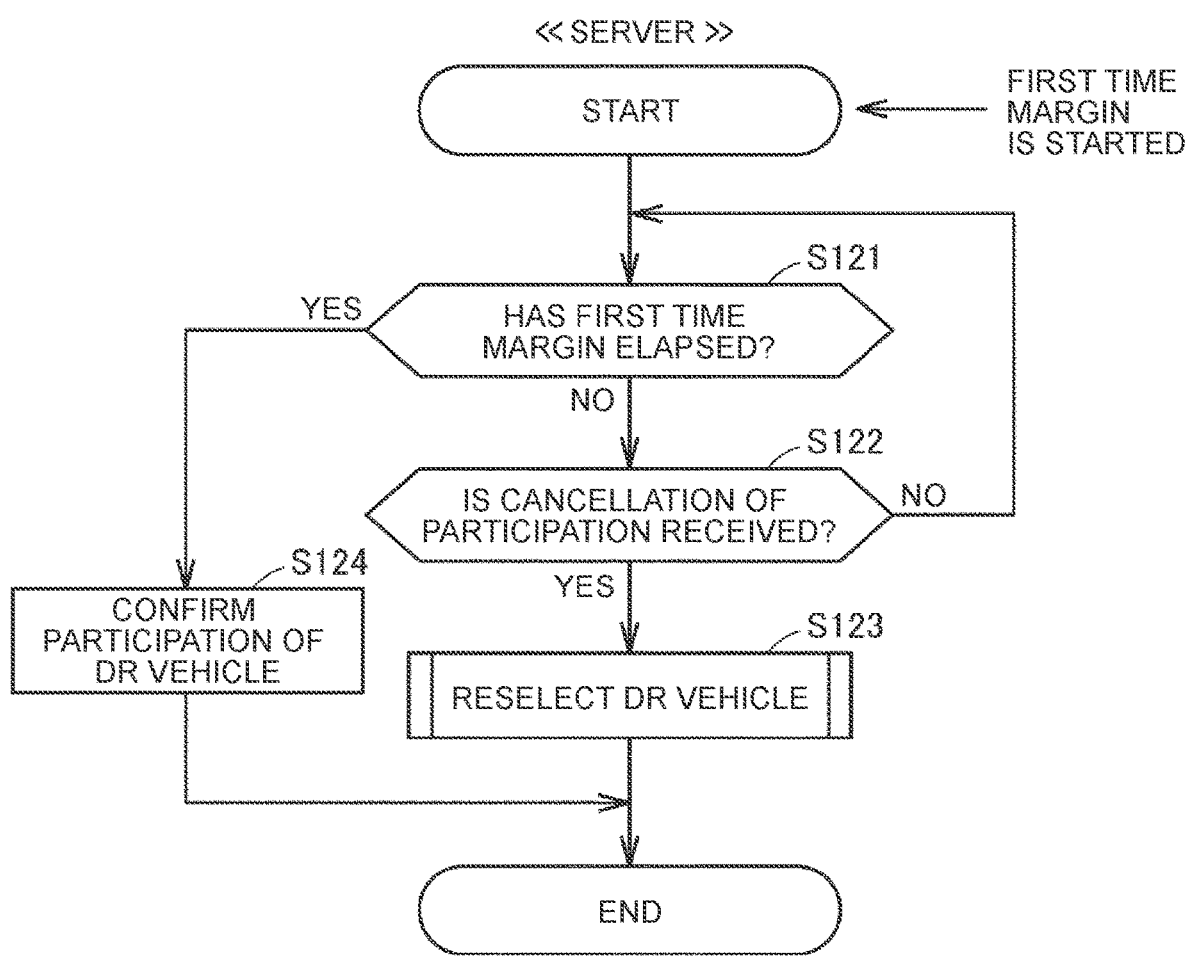
FIG. 12 is a flowchart illustrating processes to be executed by the management computer for the power grid in the first modified example.

FIG. 12 is a flowchart illustrating processes to be executed by the control device 31 of the server 30 in the first modified example. The processes in this flowchart are started at the start timing of the first time margin. The first time margin is identical to the first time margin in the processes illustrated in FIG. 11.

Referring to FIG. 12 together with FIG. 1 to FIG. 4, the control device 31 determines in S121 whether the first time margin has elapsed. When the first time margin has not elapsed ("NO" in S121), the control device 31 determines in S122 whether the DR participation canceling notification (S113 of FIG. 11) is received from any DR vehicle.

When the DR participation canceling notification is received from any DR vehicle within the first time margin ("YES" in S122), the control device 31 reselects a DR vehicle in S123. For example, the control device 31 selects a DR vehicle through the processes illustrated in FIG. 5 in place of the DR vehicle that has canceled the DR participation. The DR vehicle that has canceled the DR participation is excluded from the candidates for the DR vehicle in S12 of FIG. 5. The first time margin may newly be set in the reselection, and the processes illustrated in FIG. 11 and FIG. 12 may be executed again at the start timing of the first time margin. Alternatively, the first time margin need not be set in the reselection.

When the first time margin has elapsed ("YES" in S121) in a state in which the DR participation canceling notification is not received from any DR vehicle within the first time margin ("NO" in S122), the participation of each DR vehicle in the DR (demand-and-supply adjustment in the power grid PG) is confirmed in S124. By executing the process of S123 or S124, the series of processes illustrated in FIG. 12 is terminated.

In the embodiment described above, when selecting the DR vehicle (S12 of FIG. 5), a vehicle 50 in a connector-disconnected state (that is, a vehicle 50 in which the connector 43 is not connected to the inlet 110) is excluded from the candidates for the DR vehicle. The selection method is not limited to this method, and the vehicle 50 in the connector-disconnected state as well as the vehicle 50 in the connector-connected state may be selected as the DR vehicle. A second modified example is described below with reference to FIG. 13 and FIG. 14 in addition to FIG. 11 and FIG. 12.

In the second modified example, the DR vehicle that is in the connector-connected state at the time of response of acceptance (hereinafter referred to also as "first DR vehicle") executes the processes illustrated in FIG. 11 similarly to the first modified example. The first time margin for use in the processes illustrated in FIG. 11 may be transmitted from the server 30 to the first DR vehicle in S13 of FIG. 5 or determined under a contract in advance. The server 30 executes the processes illustrated in FIG. 12 for the first DR vehicle.

The DR vehicle that is in the connector-disconnected state at the time of response of acceptance (hereinafter referred to also as "second DR vehicle") executes the following processes illustrated in FIG. 13. In the processes illustrated in FIG. 13, a second time margin is used. The second time margin may be transmitted from the server to the second DR vehicle in S13 of FIG. 5 or determined under a contract in advance. The server 30 executes processes illustrated in FIG. 14 for the second DR vehicle as described later.

Figure 13:
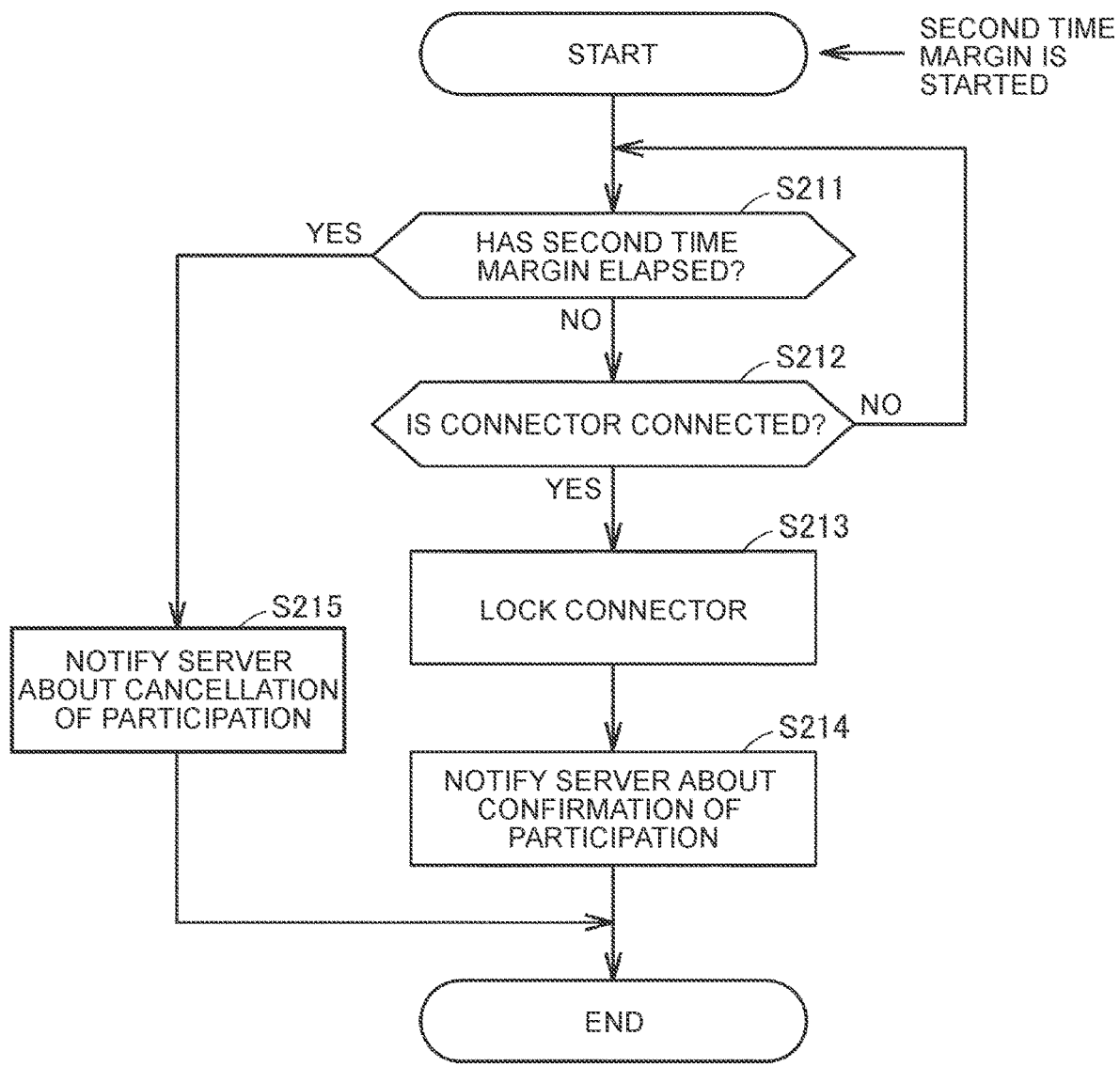
FIG. 13 is a flowchart illustrating processes to be executed by the vehicle control device of a second DR vehicle in a second modified example.

FIG. 13 is a flowchart illustrating processes to be executed by the ECU 150 of the second DR vehicle in the second modified example. The processes in this flowchart are started at a start timing of the second time margin. In this modified example, the second time margin is a predetermined period (for example, 10 minutes to 30 minutes) from a timing when the user of the vehicle 50 has sent the response to accept the DR participation request from the server 30 (see, for example, S13 of FIG. 5). The processes illustrated in FIG. 13 are started when the user of the vehicle 50 sends the response of the acceptance. In this modified example, the server 30 does not execute the processes related to the connector lock (that is, the processes illustrated in FIG. 6), but the vehicle executes the processes related to the connector lock.

Referring to FIG. 13 together with FIG. 1 to FIG. 4, the ECU 150 determines in S211 whether the second time margin has elapsed. When the second time margin has not elapsed ("NO" in S211), the ECU 150 determines in S212 whether the connector 43 is connected to the inlet 110. For example, the ECU 150 can make the determination in S212 based on a detection result from the connection sensor 111*b*.

When the connector 43 is connected to the inlet 110 within the second time margin ("YES" in S212), the ECU 150 controls the connector lock device 111 in S213 to lock the connector. In S214, the ECU 150 transmits a participation confirming notification (that is, a signal indicating that the vehicle participates in the demand-and-supply adjustment in the power grid PG) to the server 30 together with the vehicle ID. By executing the process of S214, the series of processes illustrated in FIG. 13 is terminated.

When the second time margin has elapsed ("YES" in S211) in a state in which the connector 43 is not connected to the inlet 110 within the second time margin ("NO" in S212), the ECU 150 transmits, in S215, a DR participation canceling notification (that is, a signal indicating that the vehicle does not participate in the demand-and-supply adjustment in the power grid PG) to the server 30 together with the vehicle ID. By executing the process of S215, the series of processes illustrated in FIG. 13 is terminated.

In this modified example, the determination of "YES" in S212 confirms that the DR vehicle participates in the DR (demand-and-supply adjustment in the power grid PG). At the timing when the participation has been confirmed, the ECU 150 of the DR vehicle locks the connector (S213).

Figure 14:
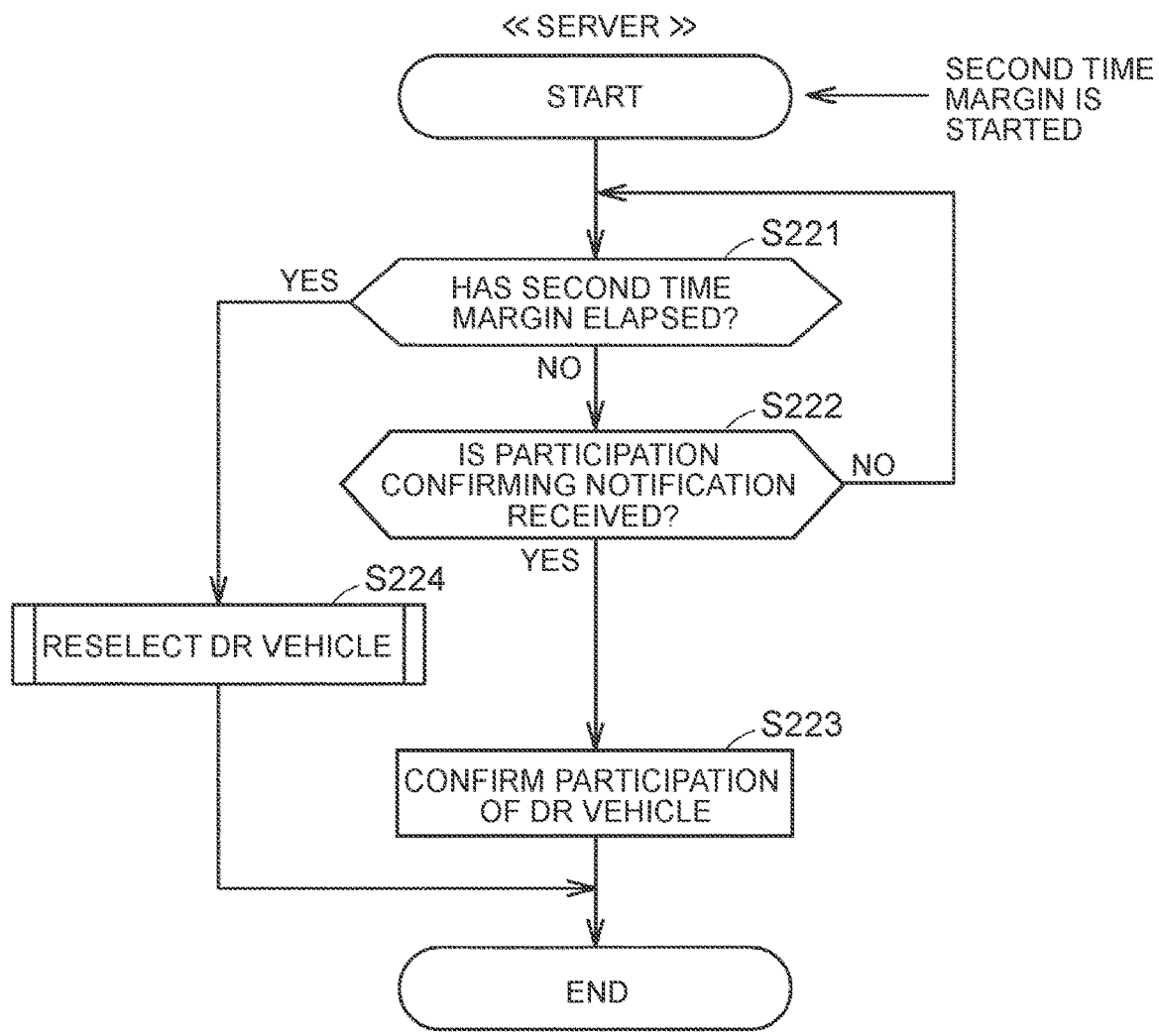
FIG. 14 is a flowchart illustrating processes to be executed by the management computer for the power grid in the second modified example.

FIG. 14 is a flowchart illustrating processes to be executed by the control device 31 of the server 30 in the second modified example. The processes in this flowchart are started at the start timing of the second time margin. When the DR vehicles selected through the processes illustrated in FIG. 5 include a plurality of second DR vehicles, the processes illustrated in FIG. 14 are executed for each second DR vehicle. The second time margin is identical to the second time margin in the processes illustrated in FIG. 13.

Referring to FIG. 14 together with FIG. 1 to FIG. 4, the control device 31 determines in S221 whether the second time margin has elapsed. When the second time margin has not elapsed ("NO" in S221), the control device 31 determines in S222 whether the participation confirming notification (S214 of FIG. 13) is received from the second DR vehicle.

When the participation confirming notification is received from the second DR vehicle within the second time margin ("YES" in S222), it is confirmed in S223 that the second DR vehicle that has transmitted the participation confirming notification participates in the DR (demand-and-supply adjustment in the power grid PG). By executing the process of S223, the series of processes illustrated in FIG. 14 is terminated.

When the second time margin has elapsed ("YES" in S221) in a state in which the participation confirming notification is not received from the second DR vehicle within the second time margin ("NO" in S222), the control device 31 cancels, in S224, the DR participation of the second DR vehicle that has not transmitted the participation confirming notification within the second time margin, and reselects a DR vehicle. For example, the control device 31 selects a DR vehicle through the processes illustrated in FIG. 5 in place of the second DR vehicle that has canceled the DR participation. By executing the process of S224, the series of processes illustrated in FIG. 14 is terminated. The second time margin may newly be set when a second DR vehicle is reselected. Then, the processes illustrated in FIG. 13 and FIG. 14 may be executed again at the start timing of the second time margin. Alternatively, the second time margin need not be set in the reselection.

In S222 of FIG. 14, determination is made as to whether the participation confirming notification is received from the second DR vehicle. Instead, determination may be made as to whether the connector 43 is connected to the inlet 110 of the second DR vehicle. The control device 31 may determine whether the connector 43 is connected to the inlet 110 of the second DR vehicle based on an outlet cable connection status received from the second DR vehicle.

In the embodiment described above, the request timing is earlier than the DR start time by several hours (see S13 of FIG. 5). The request timing is not limited to this timing, and may be earlier than the DR start time by 24 hours or longer. When the request timing and the DR start time are separated from each other by a predetermined period or longer, the DR vehicle and the server 30 may execute the processes illustrated in FIG. 13 and FIG. 14, respectively. When the second time margin is started after the response of acceptance, the user of each DR vehicle cannot freely execute the external power charge for a purpose other than DR during a period from the response of acceptance to the DR start time. Therefore, the user's convenience may decrease. When the request timing and the DR start time are separated from each other by the predetermined period or longer, the start timing of the second time margin may be set based on the DR start time. For example, in a case where the request timing and the response timing of DR that will start at 15:00 on Jul. 7, 2020 are Jul. 1, 2020, the second time margin may be set to a period from 13:00 to 14:00 on the DR execution date (Jul. 7, 2020). In this example, the start timing of the second time margin is set earlier than the DR start time by 2 hours, and the end timing of the second time margin is set earlier than the DR start time by 1 hour.

In the embodiment described above, the server 30 controls charge and discharge of the battery 130 through the remote operation in the DR period. The charge/discharge control is not limited to such control. The DR vehicle may receive a charge/discharge schedule from the server 30 before the start of DR, and control charge and discharge of the battery 130 in accordance with the charge/discharge schedule in the DR period. A third modified example is described below with reference to FIG. 15 to FIG. 18.

In the third modified example, the schedule signal transmitted from the server 30 to each DR vehicle in S17 of FIG. 5 indicates the charge/discharge schedule as well as the DR period. When the schedule signal is received, the ECU 150 of the DR vehicle writes the charge/discharge schedule indicated by the schedule signal into the DR schedule in the storage device 153.

Figure 15:
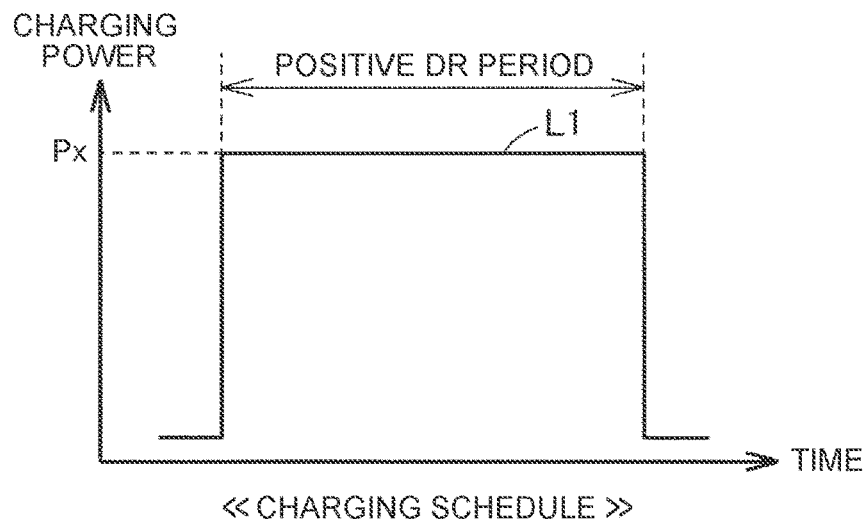
FIG. 15 illustrates information indicating a first example of a charge/discharge schedule indicated by a schedule signal employed in a third modified example.

FIG. 15 illustrates information indicating a first example of the charge/discharge schedule indicated by the schedule signal employed in the third modified example. A line L1 represents a charging schedule responding to a request to increase power demand. The line L1 indicates that external power charge with electric power Px is executed in the DR period (more specifically, a positive DR period).

Figure 16:
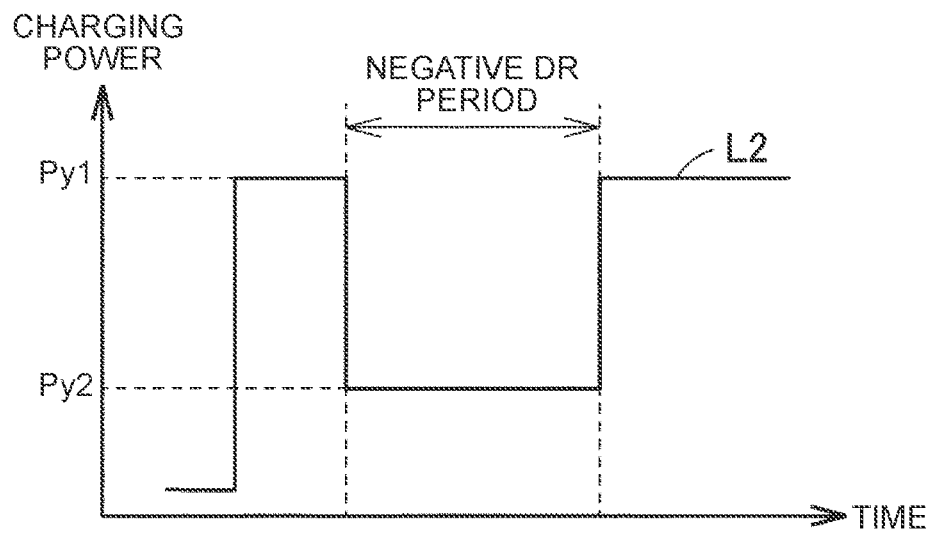
FIG. 16 illustrates information indicating a second example of the charge/discharge schedule indicated by the schedule signal employed in the third modified example.

FIG. 16 illustrates information indicating a second example of the charge/discharge schedule indicated by the schedule signal employed in the third modified example. A line L2 represents a charge suppression schedule responding to a request to reduce power demand. The line L2 indicates that external power charge with electric power Py2 lower than intended electric power Py1 (for example, charging power indicated by the charging schedule) is executed in the DR period (more specifically, a negative DR period). A charge suppression schedule for prohibiting charging in the DR period may be employed in place of the charge suppression schedule illustrated in FIG. 16.

Figure 17:
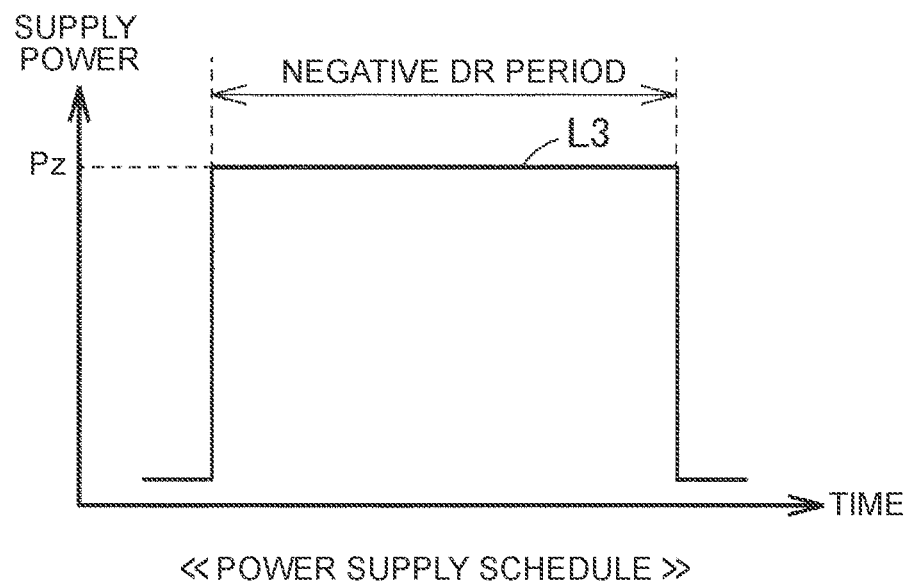
FIG. 17 illustrates information indicating a third example of the charge/discharge schedule indicated by the schedule signal employed in the third modified example.

FIG. 17 illustrates information indicating a third example of the charge/discharge schedule indicated by the schedule signal employed in the third modified example. A line L3 represents a power supply schedule responding to a request for the reverse power flow. The line L3 indicates that external power supply with electric power Pz is executed in the DR period (more specifically, a negative DR period).

Figure 18:
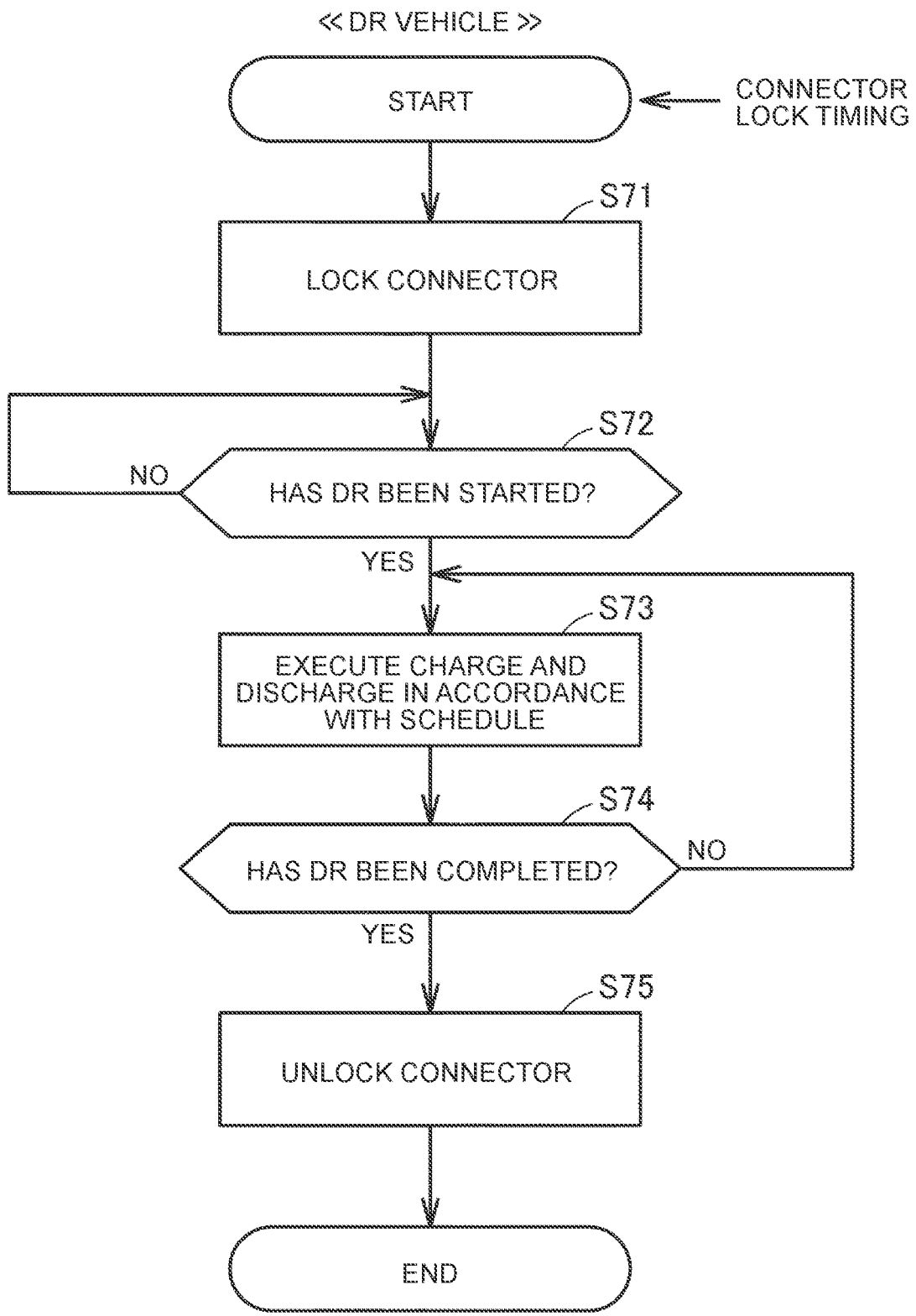
FIG. 18 is a flowchart illustrating processes to be executed by the vehicle control device of each DR vehicle that has confirmed participation in the third modified example.

In the third modified example, the ECU 150 of each DR vehicle executes the following processes illustrated in FIG. 18 in place of the processes illustrated in FIG. 7 to FIG. 10. The server 30 does not execute the connector control (that is, the processes illustrated in FIGS. 6 and S33 of FIG. 7), but the vehicle executes the connector control. In the third modified example, when the participation of the vehicle 50 in DR is confirmed, the processes illustrated in FIG. 8 are not executed, and the connector control is executed through the processes illustrated in FIG. 18. When the processes illustrated in FIG. 18 are terminated along with completion of the DR, the vehicle 50 resumes the processes illustrated in FIG. 8. During a period from the confirmation of the participation to the completion of the DR, unlocking of the connector 43 connected to the inlet 110 is prohibited through the processes illustrated in FIG. 18.

FIG. 18 is a flowchart illustrating processes to be executed by the ECU 150 of each DR vehicle that has confirmed participation in the third modified example. The processes in this flowchart are started at the predetermined connector lock timing. The connector lock timing can be set arbitrarily as long as the participation has been confirmed at that timing. In the third modified example, the connector lock timing is the first lock timing (timing when the participation has been confirmed). The connector lock timing may be the second lock timing (timing earlier than the DR start time by the predetermined period).

Referring to FIG. 18 together with FIG. 1 to FIG. 4, the ECU 150 controls the connector lock device 111 in S71 to lock the connector. In S72, the ECU 150 waits until the DR start time comes. When the DR start time has come ("YES" in S72), the ECU 150 controls, in S73, charge and discharge of the battery 130 in accordance with a charge/discharge schedule indicated by the DR schedule in the storage device 153 (for example, the charge/discharge schedule illustrated in any one of FIG. 15 to FIG. 17). In S74, the ECU 150 determines whether the DR end time has come. In the DR period ("NO" in S74), the charge and discharge of the battery 130 are controlled through the process of S73. When the DR end time has come ("YES" in S74), the ECU 150 controls the connector lock device 111 in S75 to unlock the connector. Thus, the time and effort to unlock the connector after the completion of the DR are saved, thereby improving the user's convenience. By executing the process of S75, the series of processes illustrated in FIG. 18 is terminated.

In the configuration according to the third modified example, the connector unlocking is prohibited during the period from the confirmation of the participation to the completion of the DR. The connector control according to the third modified example corresponds to an example of "first unlocking prohibition control". The method for the first unlocking prohibition control is not limited to the method in the third modified example. For example, in the embodiment described above, the ECU 150 of each vehicle 50 may execute the following connector control illustrated in FIG. 19 in place of the connector control illustrated in FIG. 8.

Figure 19:
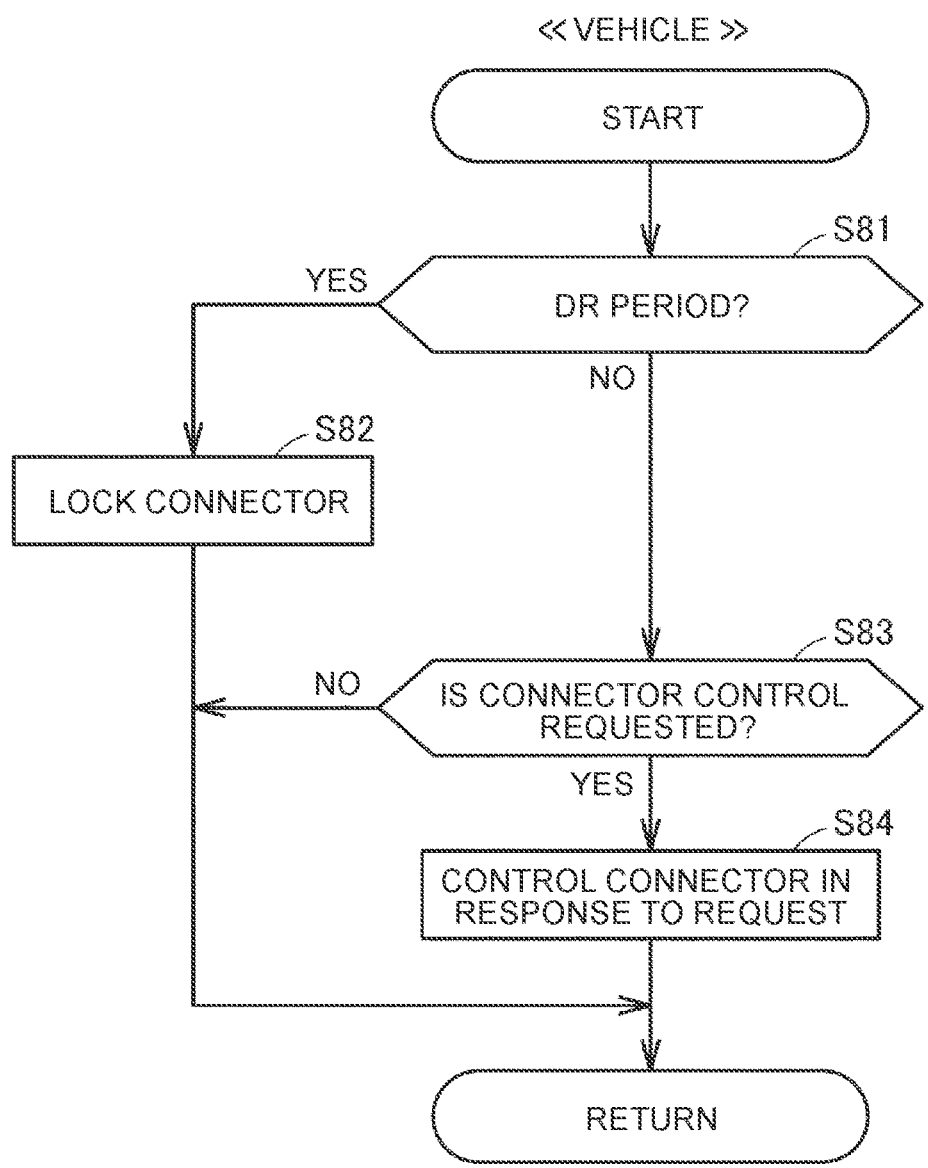
FIG. 19 is a flowchart illustrating a modified example of the connector control illustrated in FIG. 8.

FIG. 19 is a flowchart illustrating a modified example of the connector control illustrated in FIG. 8. For example, the processes in this flowchart are repeatedly executed in a state in which the connector 43 is connected to the inlet 110. When the connector 43 is detached from the inlet 110, the processes are not executed.

Referring to FIG. 19 together with FIG. 1 to FIG. 4, the connector controller 503 determines in S81 whether the current time is in the DR period. When the current time is in the DR period ("YES" in S81), the connector controller 503 controls the connector lock device 111 in S82 to lock the connector. Thus, the connector unlocking is prohibited in the DR period. When the current time is outside the DR period ("NO" in S81), connector control is executed in response to a request from the user or the server 30 through processes of S83 and S84. The processes of S83 and S84 are identical to the processes of S41 and S42 of FIG. 8, respectively.

The connector control illustrated in FIG. 19 corresponds to an example of "first unlocking prohibition control". In the connector control illustrated in FIG. 19, the connector unlocking is prohibited throughout the DR period. The first unlocking prohibition control is not limited to this connector control, and a prohibition termination condition may be set in the first unlocking prohibition control.

Figure 20:
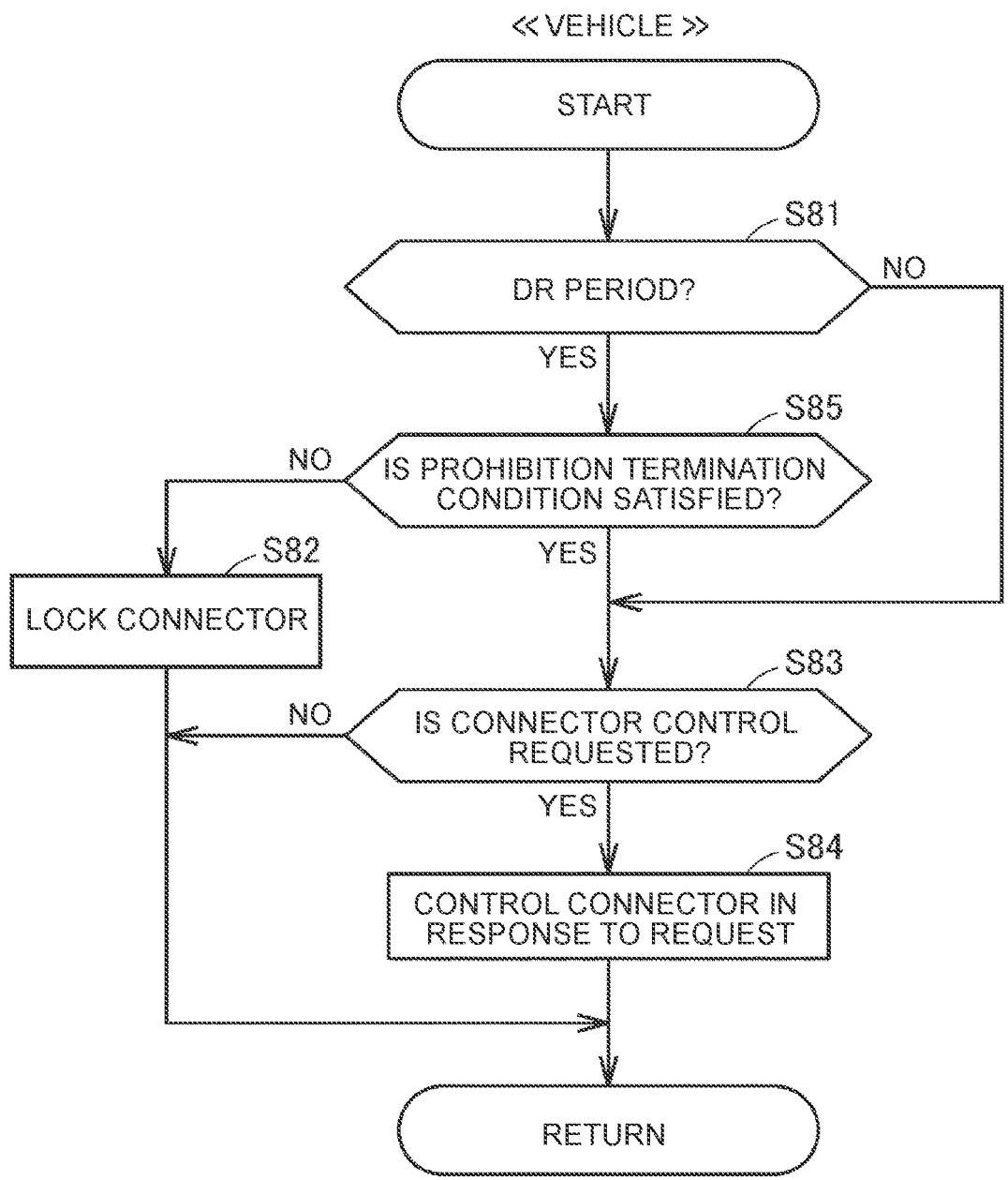
FIG. 20 is a flowchart illustrating an example of first unlocking prohibition control in which a prohibition termination condition is set.

FIG. 20 is a flowchart illustrating an example of the first unlocking prohibition control in which the prohibition termination condition is set. The connector control illustrated in FIG. 20 is described below focusing on a difference from the connector control illustrated in FIG. 19.

Referring to FIG. 20 together with FIG. 1 to FIG. 4, when the current time is outside the DR period ("NO" in S81), the connector control is executed in response to a request from the user or the server 30 through the processes of S83 and S84 similarly to the connector control illustrated in FIG. 19. When the current time is in the DR period ("YES" in S81), the connector controller 503 determines in S85 whether a predetermined prohibition termination condition is satisfied. The prohibition termination condition may be set based on at least one of the traveling schedule and the SOC of the battery 130. For example, the prohibition termination condition may be satisfied when the current time reaches a time that is a predetermined period earlier than a traveling start time indicated by the traveling schedule. The prohibition termination condition may also be satisfied when the SOC of the battery 130 is equal to or higher than a predetermined value. The prohibition termination condition is not limited to the above condition, and can be set arbitrarily.

When the prohibition termination condition is not satisfied in the DR period ("NO" in S85), the connector controller 503 locks the connector in S82. Thus, the connector unlocking is prohibited.

When the prohibition termination condition is satisfied in the DR period ("YES" in S85), the connector control is executed in response to a request from the user or the server 30 through the processes of S83 and S84. Therefore, the user can unlock the connector as necessary. By setting the prohibition termination condition, the user's convenience is improved.

The connector unlocking responding to the request from the user may be prohibited during the period from the confirmation of the participation to the completion of the DR. For example, the ECU 150 of each vehicle 50 may execute the following connector control illustrated in FIG. 21 in place of the connector control illustrated in FIG. 8 during the period from the confirmation of the participation to the completion of the DR.

Figure 21:
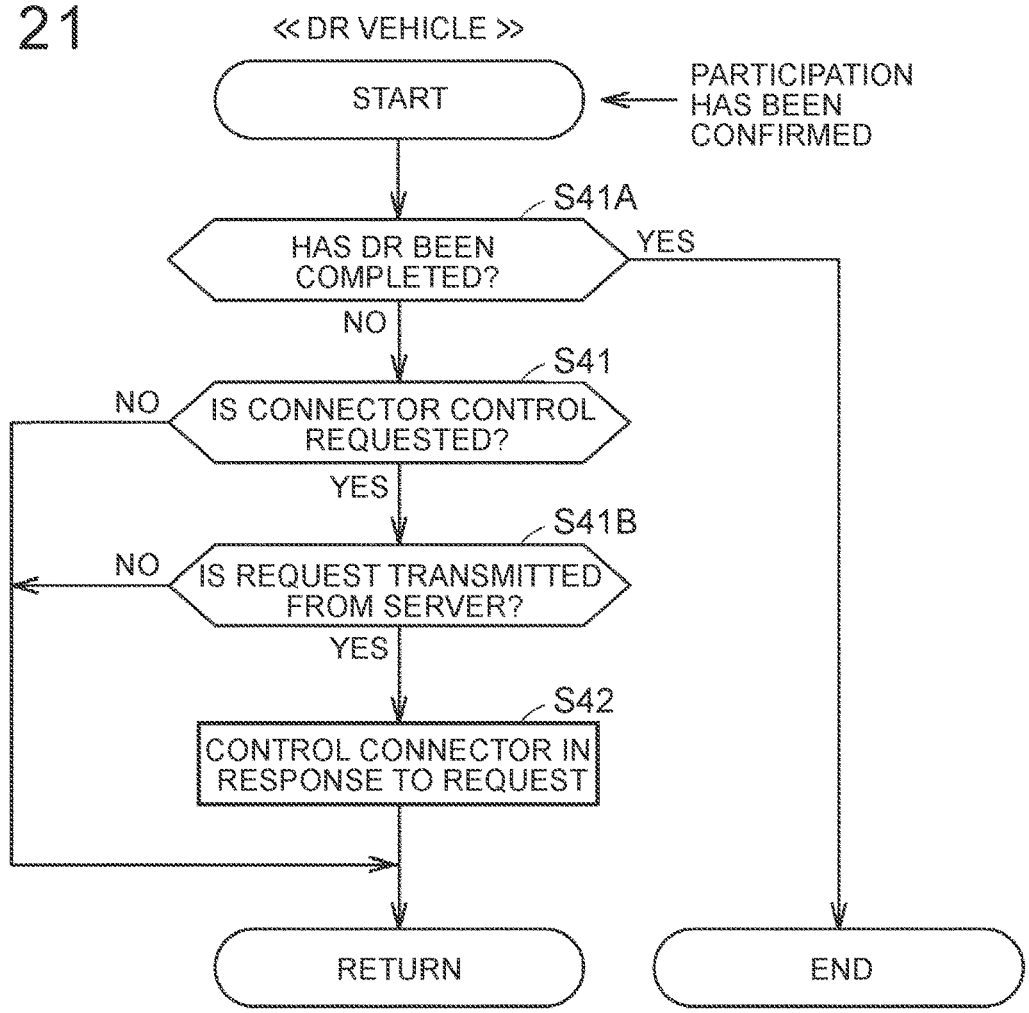
FIG. 21 is a flowchart illustrating an example of second unlocking prohibition control for prohibiting connector unlocking responding to a request from a user.

FIG. 21 is a flowchart illustrating an example of second unlocking prohibition control for prohibiting the connector unlocking responding to the request from the user. The processes in this flowchart are started by the ECU 150 of each DR vehicle at the timing when the participation in the DR has been confirmed. The participation in the DR is confirmed when the DR vehicle is in the connector-connected state. When the connector control illustrated in FIG. 21 is started, the connector control illustrated in FIG. 8 is suspended. The connector control illustrated in FIG. 21 is described below focusing on a difference from the connector control illustrated in FIG. 8.

Referring to FIG. 21 together with FIG. 1 to FIG. 4, this connector control includes S41A and S41B added to the processes illustrated in FIG. 8. In S41A, the connector controller 503 determines whether the DR end time has come. During the period from the confirmation of the participation to the completion of the DR, the determination result is "NO" in S41A, and the process proceeds to S41. When the connector controller 503 receives a connector control request ("YES" in S41), the connector controller 503 determines in S41B whether the request is transmitted from the server 30.

When the connector controller 503 receives the connector control request from the server 30 ("YES" in S41B), the connector control is executed in response to the request in S42. When the connector controller 503 receives the connector control request from the user ("NO" in S41B), the process of S42 is not executed. Thus, the connector unlocking responding to the request from the user is prohibited in the connector control illustrated in FIG. 21.

When the DR is completed ("YES" in S41A), the series of processes illustrated in FIG. 21 is terminated, and the vehicle 50 resumes the connector control illustrated in FIG. 8.

According to the connector control illustrated in FIG. 21, the user of each DR vehicle cannot unlock the connector during the period from the confirmation of the participation to the completion of the DR unless the manager of the power grid PG (for example, the aggregator) accepts the unlocking. Thus, it is possible to reduce the occurrence of a case where the scheduled power adjustment is not executed because the connector 43 is detached from the inlet 110 while the manager of the power grid PG is not informed of the detachment.

In the embodiment described above, when each DR vehicle selected through the processes illustrated in FIG. 5 has confirmed the participation in the DR (demand-and-supply adjustment in the power grid PG), the server 30 executes the connector locking control illustrated in FIG. 6 irrespective of details of the DR. The connector locking control is not limited to such control. The server 30 may execute the connector locking control illustrated in FIG. 6 only when each DR vehicle has confirmed participation in DR that satisfies a predetermined requirement. A fourth modified example is described below with reference to FIG. 22.

In the fourth modified example, the server 30 may request each vehicle 50 to execute various types of DR. The reward (incentive) for the demand-and-supply adjustment in the power grid PG varies depending on the type of the DR. Depending on the type of the DR, the user of the vehicle 50 that has confirmed the participation may avoid a penalty even if the user of the vehicle 50 does not execute the demand-and-supply adjustment in the power grid PG.

Figure 22:
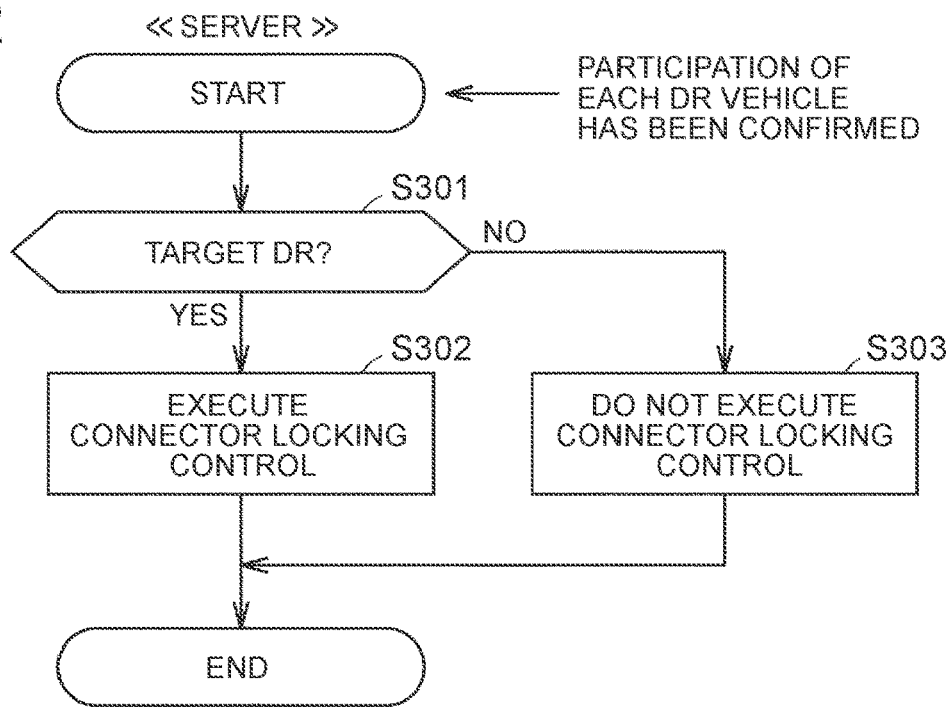
FIG. 22 is a flowchart illustrating processes to be executed by the management computer for the power grid in a fourth modified example.

FIG. 22 is a flowchart illustrating processes to be executed by the control device 31 of the server 30 in the fourth modified example. The processes in this flowchart are started by the control device 31 when each DR vehicle selected through the processes illustrated in FIG. 5 has confirmed participation in DR.

Referring to FIG. 22 together with FIG. 1 to FIG. 4, the control device 31 determines in S301 whether the DR is target DR. The target DR is DR that satisfies the predetermined requirement. Any requirement may be employed as the predetermined requirement. For example, the target DR may be at least one of DR in which the reward for the demand-and-supply adjustment in the power grid PG is equal to or larger than a predetermined value (hereinafter referred to also as "DR with high reward") and DR in which a penalty is imposed due to inexecution of the demand-and-supply adjustment in the power grid PG (hereinafter referred to also as "DR with penalty"). The target DR may also be DR in which the length of the DR period is equal to or larger than a predetermined value.

When the DR is the target DR ("YES" in S301), the control device 31 determines to execute the connector locking control in S302, and starts the connector locking control illustrated in FIG. 6. When the DR is not the target DR ("NO" in S301), the control device 31 determines not to execute the connector locking control in S303. In this case, the connector locking control illustrated in FIG. 6 is not executed. By executing the process of S302 or S303, the series of processes illustrated in FIG. 22 is terminated.

In the fourth modified example, the request for the connector locking control is transmitted to the vehicle 50 only when the vehicle 50 has confirmed the participation in the target DR. Therefore, the connector locking control can be executed only in the DR having a high need for the connector locking control. This configuration suppresses a decrease in the user's convenience due to unnecessary connector locking control.

In the embodiment described above, the ECU 150 of each vehicle 50 executes the connector control illustrated in FIG. 8. The connector control for each vehicle 50 is not changed even when participation in DR is confirmed. The connector control is not limited to such control. The connector control for the DR vehicle that has confirmed the participation may be changed depending on the type of the DR. For example, each DR vehicle that has confirmed the participation may execute the following processes illustrated in FIG. 23.

Figure 23:
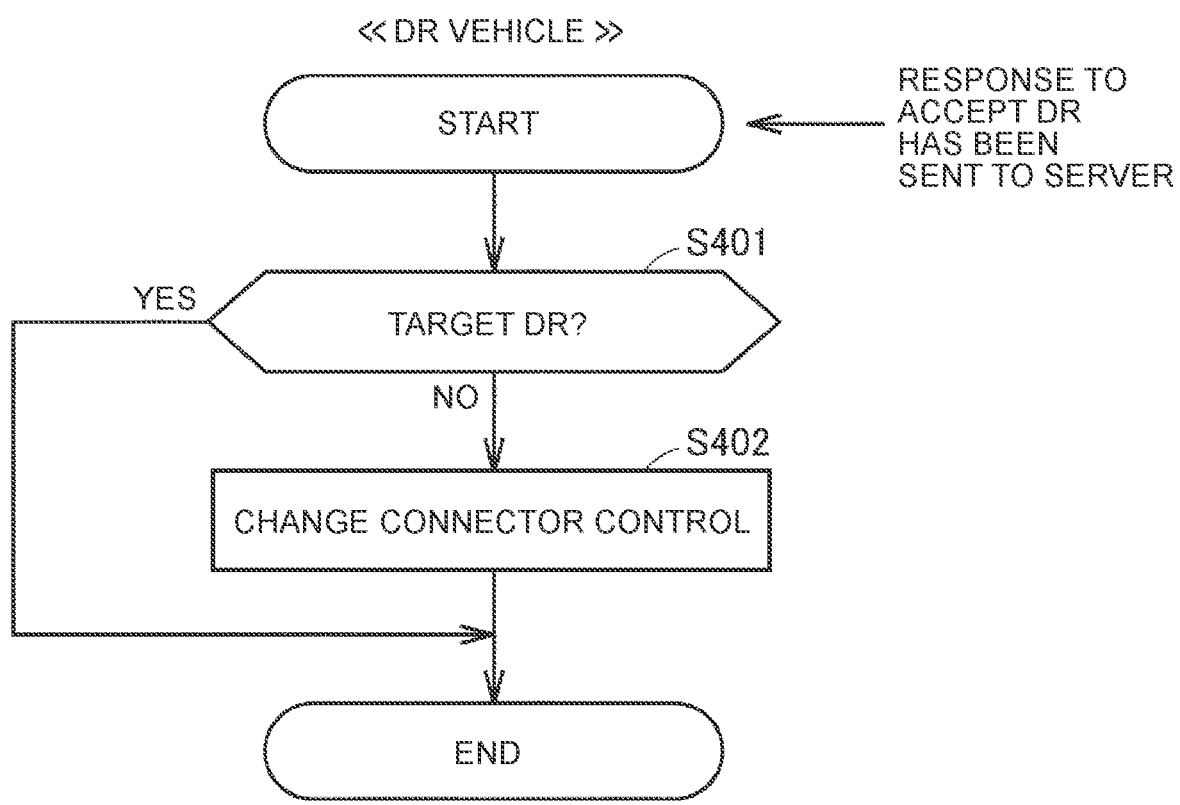
FIG. 23 is a flowchart illustrating an example of processes for changing the connector control to be executed in the DR vehicle depending on a type of DR.

FIG. 23 is a flowchart illustrating an example of processes for changing the connector control to be executed in the DR vehicle depending on the type of the DR. The processes in this flowchart are started by the ECU 150 of the vehicle 50 when the user of the vehicle 50 has sent the response to accept the DR participation request from the server 30 (see, for example, S13 of FIG. 5).

Referring to FIG. 23 together with FIG. 1 to FIG. 4, the ECU 150 determines in S401 whether the DR is target DR. The target DR is DR that satisfies the predetermined requirement. Any requirement may be employed as the predetermined requirement. For example, the target DR may be at least one of the DR with high reward and the DR with penalty. The target DR may also be DR in which the length of the DR period is equal to or larger than the predetermined value.

When the DR is not the target DR ("NO" in S401), the ECU 150 changes the connector control for the DR vehicle in S402, and then terminates the series of processes illustrated in FIG. 23. When the DR is the target DR ("YES" in S401), the ECU 150 terminates the series of processes illustrated in FIG. 23 without changing the connector control.

A mode in which the processes illustrated in FIG. 23 are applied to the third modified example is described below. In the third modified example, the connector control illustrated in FIG. 18 is executed during DR participation.

When the DR is the target DR ("YES" in S401 of FIG. 23), the connector control illustrated in FIG. 18 is executed without a change. Therefore, the connector lock is executed in S71 of FIG. 18. When the DR is not the target DR ("NO" in S401 of FIG. 23), the connector control illustrated in FIG. 18 is changed in S402 of FIG. 23 so that the connector lock (S71 of FIG. 18) is not executed.

The ECU 150 (vehicle control device) executes the connector locking control (S71 of FIG. 18) when the vehicle 50 has confirmed the participation in the target DR (demand-and-supply adjustment in the power grid that satisfies the predetermined requirement). The ECU 150 (vehicle control device) does not execute the connector locking control (S71 of FIG. 18) when the vehicle 50 has confirmed the participation in the non-target DR (demand-and-supply adjustment in the power grid that does not satisfy the predetermined requirement). In this configuration, only when the vehicle 50 participates in the target DR, the connector locking control is executed in the vehicle 50 after the participation is confirmed. Therefore, the connector locking control can be executed only in the DR having a high need for the connector locking control. This configuration suppresses a decrease in the user's convenience due to unnecessary connector locking control.

The ECU 150 of each vehicle 50 may execute the connector control including the unlocking prohibition control illustrated in any one of FIG. 19 to FIG. 21 when the DR is the target DR ("YES" in S401 of FIG. 23), and execute the connector control illustrated in FIG. 8 (connector control changed in S402 of FIG. 23) when the DR is not the target DR ("NO" in S401 of FIG. 23). This ECU 150 (vehicle control device) executes the unlocking prohibition control illustrated in any one of FIG. 19 to FIG. 21 when the vehicle 50 has confirmed the participation in the target DR, and does not execute the unlocking prohibition control in the DR period when the vehicle 50 has confirmed the participation in the non-target DR. In this configuration, only when the vehicle 50 participates in the target DR, the unlocking prohibition control is executed in the vehicle 50 after the participation is confirmed. Therefore, the unlocking prohibition control can be executed only in the DR having a high need for the unlocking prohibition control. This configuration suppresses a decrease in the user's convenience due to unnecessary unlocking prohibition control.

The configuration of the electric power system including the management computer for the power grid is not limited to the configuration illustrated in FIG. 3. For example, the functions of the server 30 may be installed in the server 10, and the server 30 may be omitted. The server 10 may function as the management computer for the power grid. The power company may be divided into separate companies for individual businesses. The power generation utility and the power transmission/distribution utility may be different companies. The DR vehicle may be a vehicle belonging to a user who has exchanged an incentive contract with the power generation utility or the power transmission/distribution utility.

It is appropriate that the vehicle to be controlled by the vehicle control device include the connection port to which the connector is connectable, and the power storage device configured to perform at least one of input of electric power supplied from the connection port and output of electric power to the connection port. The configuration of the vehicle is not limited to the configuration illustrated in FIG. 1. For example, in the configuration illustrated in FIG. 1, a charging device that supports only the external power charge or a power supply device that supports only the external power supply may be employed in place of the charger/discharger 120. The vehicle may be chargeable wirelessly. The vehicle is not limited to a passenger car, and may be a bus or a truck.

The connection of the connector to the connection port and the disconnection of the connector from the connection port may be detected by a detector other than the connection sensor. The ECU 150 may detect the connection and disconnection of the connector 43 based on a cable connection signal from power supply equipment (that is, a signal indicating whether the vehicle is connected to the power supply equipment via the outlet cable). Examples of the cable connection signal include a control pilot (CPLT) signal and a proximity signal.

It should be understood that the embodiment disclosed herein is illustrative but is not limitative in all respects. The scope of the present disclosure is defined by the claims rather than the description of the embodiment above, and is intended to encompass meanings of equivalents to the elements in the claims and all modifications within the scope of the claims.

What is claimed is:

1. A control device for a vehicle having a connection port to which a connector is connectable, the control device comprising a processor, wherein:
the vehicle includes a power storage device configured to store electric power;
the vehicle is configured to transmit the electric power between a power grid and the power storage device by connecting, to the connection port, the connector electrically connected to the power grid;
the processor is configured to execute connector locking control for locking the connector connected to the connection port when participation of the vehicle in demand-and-supply adjustment of the power grid is confirmed; and
the processor is configured to execute the connector locking control at a timing when the participation of the vehicle in the demand-and-supply adjustment of the power grid is confirmed.

2. The control device according to claim 1, wherein the processor is configured to execute connector unlocking control for unlocking the connector connected to the connection port after the demand-and-supply adjustment of the power grid is completed.

3. The control device according to claim 1, wherein:
the processor is configured to respond whether the processor accepts a request when the request to participate in the demand-and-supply adjustment of the power grid is received from a management computer for the power grid; and
the participation of the vehicle in the demand-and-supply adjustment of the power grid is confirmed when the processor sends a response to accept the request in a state where the connector is connected to the connection port.

4. The control device according to claim 1, wherein:
the processor is configured to respond whether the processor accepts a request when the request to participate in the demand-and-supply adjustment of the power grid is received from a management computer for the power grid; and
the participation of the vehicle in the demand-and-supply adjustment of the power grid is confirmed when a predetermined period elapses in a state where the connector is not detached from the connection port within the predetermined period, the predetermined period being set after the processor has sent a response to accept the request in a state where the connector is connected to the connection port.

5. The control device according to claim 4, wherein the processor is configured to transmit, to the management computer, a signal indicating that the vehicle does not participate in the demand-and-supply adjustment of the power grid when the connector is detached from the connection port within the predetermined period.

6. The control device according to claim 1, wherein:
the processor is configured to respond whether the processor accepts a request when the request to participate in the demand-and-supply adjustment of the power grid is received from a management computer for the power grid; and
the participation of the vehicle in the demand-and-supply adjustment of the power grid is confirmed when the connector is connected to the connection port within a predetermined period set after the processor has sent a response to accept the request.

7. The control device according to claim 1, wherein:
the processor is configured to execute the connector locking control when the participation of the vehicle in the demand-and-supply adjustment of the power grid that satisfies a predetermined requirement is confirmed; and
the processor is configured not to execute the connector locking control when the participation of the vehicle in the demand-and-supply adjustment in the power grid that does not satisfy the predetermined requirement is confirmed.

8. The control device according to claim 1, wherein the processor is configured to execute unlocking prohibition control for prohibiting unlocking of the connector connected to the connection port during a period from a start to an end of the demand-and-supply adjustment of the power grid.

9. The control device according to claim 1, wherein the processor is configured to execute unlocking prohibition control for selectively prohibiting unlocking of the connector connected to the connection port in response to a request from a user during a period from a start to an end of the demand-and-supply adjustment of the power grid.

10. The control device according to claim 8, wherein:
the processor is configured to execute, when the participation of the vehicle in the demand-and-supply adjustment of the power grid that satisfies a predetermined requirement is confirmed, the unlocking prohibition control during a period from a start to an end of the demand-and-supply adjustment of the power grid; and
the processor is configured not to execute, when the participation of the vehicle in the demand-and-supply adjustment of the power grid that does not satisfy the predetermined requirement is confirmed, the unlocking prohibition control during a period from a start to an end of the demand-and-supply adjustment of the power grid.

11. The control device according to claim 7, wherein the predetermined requirement is satisfied when a reward for the demand-and-supply adjustment of the power grid is equal to or larger than a predetermined value.

12. The control device according to claim 7, wherein the predetermined requirement is satisfied when a penalty is imposed due to inexecution of the demand-and-supply adjustment of the power grid.

13. The control device according to claim 11, wherein the predetermined requirement is satisfied when a penalty is imposed due to inexecution of the demand-and-supply adjustment of the power grid.

14. The control device according to claim 1, wherein the processor is configured to execute the connector locking control at a timing earlier by a predetermined period than a start time of the demand-and-supply adjustment of the power grid after the participation of the vehicle in the demand-and-supply adjustment of the power grid has been confirmed.

15. A non-transitory storage medium storing instructions that are executable by one or more processors in a management computer for a power grid, and that cause the one or more processors to perform functions, the management computer being configured to send a request for demand-and-supply adjustment of the power grid to a user of a vehicle having a connection port to which a connector is connectable and a power storage device configured to perform at least one of input of electric power supplied from the connection port and output of electric power to the connection port, the functions comprising:
- requesting the vehicle to execute connector locking control for locking the connector connected to the connection port when participation of the vehicle in the demand-and-supply adjustment of the power grid is confirmed; and
- executing the connector locking control at a timing when the participation of the vehicle in the demand-and-supply adjustment of the power grid is confirmed.

16. The non-transitory storage medium according to claim 15, wherein the participation of the vehicle in the demand-and-supply adjustment of the power grid is confirmed when a request to participate in the demand-and-supply adjustment of the power grid is sent to the user of the vehicle and a response to accept the request is received.

17. A connector locking control method comprising:
- sending, by a management computer for a power grid, a request for demand-and-supply adjustment of the power grid to a user of a vehicle having a connection port to which a connector is connectable and a power storage device configured to perform at least one of input of electric power supplied from the connection port and output of electric power to the connection port;
- responding to the management computer when the request is accepted; and
- executing connector locking control for locking the connector connected to the connection port in the vehicle at a predetermined connector lock timing after a response to accept the request is sent; and
- executing the connector locking control at a timing when the participation of the vehicle in the demand-and-supply adjustment of the power grid is confirmed.

* * * * *